(12) United States Patent
Tsia et al.

(10) Patent No.: US 11,656,447 B2
(45) Date of Patent: May 23, 2023

(54) APPARATUS AND METHOD FOR FAST VOLUMETRIC FLUORESCENCE MICROSCOPY USING TEMPORALLY MULTIPLEXED LIGHT SHEETS

(71) Applicant: THE UNIVERSITY OF HONG KONG, Hong Kong (CN)

(72) Inventors: Kevin Kin Man Tsia, Hong Kong (CN); Yuxuan Ren, Hong Kong (CN); Jianglai Wu, Hong Kong (CN); Andy Kam Seng Lau, Hong Kong (CN); Queenie Tsz Kwan Lai, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 0 days.

(21) Appl. No.: 17/267,567

(22) PCT Filed: Sep. 27, 2019

(86) PCT No.: PCT/CN2019/108625
§ 371 (c)(1),
(2) Date: Feb. 10, 2021

(87) PCT Pub. No.: WO2020/063895
PCT Pub. Date: Apr. 2, 2020

(65) Prior Publication Data
US 2021/0325651 A1 Oct. 21, 2021

Related U.S. Application Data

(60) Provisional application No. 62/738,261, filed on Sep. 28, 2018.

(51) Int. Cl.
*G02B 21/00* (2006.01)
*G01N 21/64* (2006.01)
(Continued)

(52) U.S. Cl.
CPC ..... *G02B 21/0076* (2013.01); *G01N 21/6458* (2013.01); *G01N 21/6486* (2013.01);
(Continued)

(58) Field of Classification Search
CPC .......................... G01N 21/8851; G02B 21/367
See application file for complete search history.

(56) References Cited

U.S. PATENT DOCUMENTS

2003/0132394 A1* 7/2003 Wolleschensky .. G02B 21/0072
250/458.1
2014/0099659 A1 4/2014 Keller
(Continued)

FOREIGN PATENT DOCUMENTS

CN 107966802 A 4/2018
CN 108267445 A 7/2018
(Continued)

OTHER PUBLICATIONS

Carl Zeiss Microscopy GmbH Zeiss Lightsheet Z.1 Product Information, 19 pages (Year: 2014).*
(Continued)

*Primary Examiner* — David P Porta
*Assistant Examiner* — Meenakshi S Sahu
(74) *Attorney, Agent, or Firm* — Saliwanchik, Lloyd & Eisenschenk

(57) ABSTRACT

A microscopy device comprises a continuous or pulsed wave laser light source; a pair of parallel mirrors configured to receive light from the light source and reflect an array of incoherent light sheets; a beam encoder (e.g., frequency modulation reticle, Hadamard basis, random modulation pattern) to segment the array of incoherent light sheets and encode each light sheet with a respective frequency in reciprocal space; a lens configured to direct the encoded light sheets towards a biological sample; and an image capturing device configured to receive a fluorescence signal from the biological sample.

20 Claims, 23 Drawing Sheets

(51) Int. Cl.
  *G01N 21/88* (2006.01)
  *G02B 21/36* (2006.01)

(52) U.S. Cl.
  CPC ..... *G01N 21/8851* (2013.01); *G02B 21/0032* (2013.01); *G02B 21/367* (2013.01)

(56) References Cited

U.S. PATENT DOCUMENTS

| | | |
|---|---|---|
| 2017/0146781 A1 | 5/2017 | Rondeau |
| 2018/0088305 A1 | 3/2018 | Itoh et al. |
| 2019/0004301 A1* | 1/2019 | Preza ................ G02B 21/0064 |
| 2019/0056581 A1* | 2/2019 | Tomer ............... G02B 21/0048 |

FOREIGN PATENT DOCUMENTS

| | | | |
|---|---|---|---|
| EP | 0231542 A2 | 8/1987 | |
| WO | WO-2017/180680 A1 | 10/2017 | |
| WO | WO-2018140773 A1 * | 8/2018 | ............... G06T 7/97 |

OTHER PUBLICATIONS

Wu et al. Ultrafast laser-scanning time-stretch imaging at visible wavelengths, Light: Science & Applications vol. 6, e16196, 10 pages (Year: 2016).*

Girken et al. The light-sheet microscopy revolution, Journal of Optics vol. 20, No. 5, 053002, 20 pages (Year: 2018).*

International Search Report dated Jan. 2, 2020 in International Application No. PCT/CN2019/108625.

* cited by examiner

APPARATUS AND METHOD FOR FAST VOLUMETRIC FLUORESCENCE MICROSCOPY USING TEMPORALLY MULTIPLEXED LIGHT SHEETS

CROSS-REFERENCE TO RELATED APPLICATIONS

This application is the U.S. national stage application of International Patent Application No. PCT/CN2019/108625, filed Sep. 27, 2019, which claims the benefit of U.S. Provisional Patent Application No. 62/738,261, filed Sep. 28, 2018, the disclosure of each of which is incorporated herein by reference in its entirety.

BACKGROUND OF THE INVENTION

Biological imaging has been utilized for imaging physiologically relevant systems for many years.

The grand challenge of understanding the animate processes of complex biological systems in three-dimension (3D) lies in the lack of imaging modalities that enable monitoring of the dynamics at sufficiently high spatiotemporal resolution and with low level of photodamage. Established 3D biological imaging techniques, namely confocal and multiphoton microscopy, and light Sheet Fluorescence Microscopy (LSFM) is a biological imaging technique that operates by decoupling the illumination and detection optical pathways; and uses different illumination techniques to optimize the photon collecting efficiency of the system. However, these light-based imaging systems can cause photo-damage and induce photo-toxicity in a biological sample. These light-based imaging systems predominantly rely on the laser scanning that often compromises imaging speed because the entire 3D field-of-view (FOV) has to be sequentially scanned by the mechanical motions involving galvanometric scanner or bulky imaging lens. While assorted techniques have been developed to scale the scanning speed, they inevitably demand higher system complexity, including dedicated beam-scanning control and hardware synchronization. Indeed, laser-scanning based imaging is inherently power inefficient as the spatial duty cycle is always far less than unity (i.e., only a fraction of entire volume is read out within a volume frame time). Even worse, many scanning approaches repeatedly excite out-of-focus fluorescence, and thus accelerate photobleaching and photodamage.

Conventional light-based biological imaging systems use a single light sheet to perform three-dimensional (3D) volumetric imaging by either scanning the biological sample or synchronously scanning both the light sheet and detection objective. The imaging speed is therefore limited by the scanning speed, which can cause resonant oscillation in the system. This oscillation can cause the system to be unstable during the scanning procedure.

Conventional lattice light-sheet microscopy techniques detect functional and structural information of the biological cells by inferring information from correlated image contrasts. These techniques also emphasize the spatial resolution, but lack the temporal resolution, and rely on scanning either the sample stage; or both the illumination beam and the detection objective. These techniques have a considerably low volume frame rate and are negatively influenced by stage drift caused by the scanning.

To address these challenges, the concept of parallelized illumination (detection), i.e., all voxels are excited (recorded) simultaneously, has become the major pursuit in advanced 3D imaging. Other than the improvement in imaging speed, parallelization in illumination (detection) allows maximizing the spatial duty cycle, and thus photon budget. This is particularly critical for preserving the biological specimen viability. Current parallelization methods are however so far either limited to 2D (e.g., LSFM) or sparse-sampling in 3D (c.f., multi-focal or multi-light-sheet microscopy). Notably, available multi-light-sheet imaging systems largely rely on beam interference, coherent wavefront engineering (in the spatial or Fourier domain) or beam splitting. However, to avoid illumination artifact arising from interplay between coherent beam and highly scattered tissue (e.g., speckle noise), these methods typically run in a sparse sampling mode with a limited number of light sheets and still require sequential beam scanning (or dithering) to achieve time-averaged incoherent superposition of light sheets.

Another emerging technique is light-field microscopy in which the axial information can be distinguished via the structural dimensions on a 2D camera through an array of microlenses. The final 3D image is computationally reconstructed with algorithms that solve the inverse problem—leading to the limitations of reduced lateral resolution and high image computational complexity.

Selective plane illumination microscopy (SPIM) systems produce multidimensional images of samples with a feature size up to a few millimeters. SPIM uses light sheet illumination and an orthogonal detection system to reach fast parallel detection using an array detector. These systems can image organisms including a Madaka embryo and *Drosophila melanogaster* embryogenesis. These systems have many derivatives, including multiView and isoView fluorescence volumetric imaging systems. However, these SPIM systems all scan samples with multiple beams that have multiple degrees of freedom. This causes faster degradation of the imaging speed. Additionally, data processing can take as long as 24 hours to reconstruct a single volumetric multiView image.

Digital scanning light sheet microscopy produces an elongated illumination point spread function via scanning the focused beam along one dimension. This technique produces a temporally shared one-dimensional (1D) point spread function, and avoids illuminating the sample continuously, but requires a higher laser power to produce the same level of fluorescent counts. Furthermore, the sample stage needs to be scanned to capture a volumetric frame, thus the volumetric frame rate is low. As a result, an inherent stage drift will cause deterioration of the image quality.

BRIEF SUMMARY OF THE INVENTION

In one embodiment of the present invention, the volumetric fluorescence microscopy techniques or coded light-sheet array microscopy (CLAM) described herein enables parallelized light-sheet illumination and detection. The techniques are based on reconfigurable generation of an incoherent and frequency-encoded light-sheet array. CLAM enables simultaneous capture of all optically-sectioned image planes at a video volume rate of >10 Hz; and without mechanical scanning or active-beam manipulation. This 3D parallelization feature allows for a longer pixel dwell time and a gentler exposure compared to conventional microscopy techniques (e.g., confocal fluorescence microscopy).

The imaging technique uses a pair of highly reflective mirrors to modify a light beam into a series of parallel and mutually incoherent light sheets and then direct the light sheets towards a biological sample. A fluorescence signal from the biological sample is excited by light sheets that have been temporally modulated with respective frequencies. An array detector can record the temporally modulated sheets and the recorded signal can later be demultiplexed off-line to analyze 3D signal information from the sample.

The system acquires volumetric images without scanning, which makes it more resistant to mechanical and environmental vibrations. The non-scanning volumetric imaging is made possible by two features. First, a pair of highly reflected mirrors that reflect the source light between the mirrors multiple times and then retro-reflect incoherent light sheets. These reflected incoherent light sheets can be viewed as emanating from a series of virtual sources. A biological sample can be illuminated by the volumetric light sheets. Second, each incoherent light sheet is temporally segmented by a variable frequency chopper and modulated with a respective frequency. Different planes of the sample can correspond to different modulated frequencies. The volumetric image of the biological sample (e.g., blood vessels in tissue, plant cells, zebra fish embryo etc.) can be analyzed by a temporal demultiplexing device that combines images from different depths of the sample into a single image.

In another embodiment of the present invention, the method described herein exploits fully parallelized multiple-plane fluorescence imaging, coined coded light-sheet array microscopy (CLAM). It does not rely on the widely adopted coherent multi-light-sheet generation concept and thus bypasses the need for complication in precise phase control and mechanical beam scanning/dithering. Instead, CLAM achieves 3D parallelized illumination by harnessing the concept of "infinity mirror" based on an angle-misaligned mirror pair to generate a light-sheet array that is reconfigurable in both array density and coherency. This warrants the incoherent superposition of the dense array of light sheets without beam dithering—favoring deep and scattered tissue imaging with minimal illumination artifact and speckle noise.

Regarding parallelized 3D image detection, CLAM implements multiplexed image-plane encoding of fluorescence signals. It ensures optical sectioning without any scanning mechanism, and thus allows fast volumetric frame rate. The 100% spatial duty cycle in detection also implies longer voxel dwell time. In other words, CLAM requires less intense illumination and thus further reduces photodamage and photobleaching without sacrificing the signal-to-noise ratio (SNR). The concept of CLAM can easily be adapted with any existing LSFM systems with minimal hardware or software modification (no complex iterative image reconstruction algorithm is needed).

CLAM could be particularly well-suited for long-term dynamical volumetric imaging of live cellular, tissue, and organism, as well as high-throughput volumetric visualization for 3D histopathological investigation of archival biological samples—both are instrumental in a wide range of biological research, notably in neuroscience and developmental biology. It is noteworthy that the technique can also be used for high-volume manufacturing inspection in the industrial applications for high-throughput volumetric quality control, such as very-large scale integration (VLSI) semiconductor devices.

In contrast to the existing light-sheet imaging techniques, this invention bypasses the use of mechanical scanning optics for illuminating the specimen in 3D and thus provides higher and longer-term imaging stability. Parallelized light-sheet array illumination also allows arbitrary selective plane imaging by activating any subsets of light sheets. This invention implements 3D parallelized detection by multiplexed encoding of fluorescence signals from all imaging planes. It is implemented by optical modulation of the light-sheet array with a set of predefined codes, each of which uniquely represents each image plane. This invention ensures optical sectioning without any scanning mechanism, and thus allows fast volumetric frame rate, which is only limited by the camera frame rate. This invention maximizes the spatial duty cycle in detection and thus results in longer voxel dwell time. In other words, CLAM requires less intense illumination and thus further reduces photodamage and photobleaching without sacrificing the signal-to-noise ratio (SNR), compared to the available laser-scanning confocal microscopy and LSFM. This invention can be implemented with wavefront coding/shaping in order to increase the FOV in both axial and lateral dimensions. CLAM can also perform digital structured illumination along the axial direction—improving the resolution isotropy.

BRIEF DESCRIPTION OF THE DRAWINGS

FIG. 4 shows images and steps for a fast volumetric imaging device.

FIG. 5(a) is a volumetric image of fluorescent microspheres embedded in a 2% agarose gel at an illumination depth 30 μm. FIG. 5(b) is a volumetric image of fluorescent microspheres embedded in a 2% agarose gel at an illumination depth 100 μm. FIG. 5(c) is a volumetric image of fluorescent microspheres embedded in a 2% agarose gel at an illumination depth 300 um.

FIG. 7(a) shows a volumetric image of the fluorescent polymer beads brought by the microfluidic flow at 80 ms. FIG. 7(b) shows a volumetric image of the fluorescent polymer beads at 680 ms. FIG. 7(c) shows a volumetric image of the fluorescent polymer beads at 1.36 s. FIG. 7(d) shows a volumetric image of the fluorescent polymer beads at 1.92 s.

FIG. 8(a) is a volumetric image of the network structure of the blood vessels in a mouse intestine. FIG. 8(b) shows glomeruli attached to the blood vascular network in the optically transparent mouse's kidney tissue.

DETAILED DISCLOSURE OF THE INVENTION

The following disclosure and exemplary embodiments are presented to enable one of ordinary skill in the art to make and use a fast volumetric imaging device according to the subject invention. Various modifications to the embodiments will be readily apparent to those skilled in the art and the generic principles herein may be applied to other embodiments. Thus, the devices and methods related to the fast volumetric imaging device are not intended to be limited to the embodiments shown, but are to be accorded the widest scope consistent with the principles and features described herein.

Figure 1A:
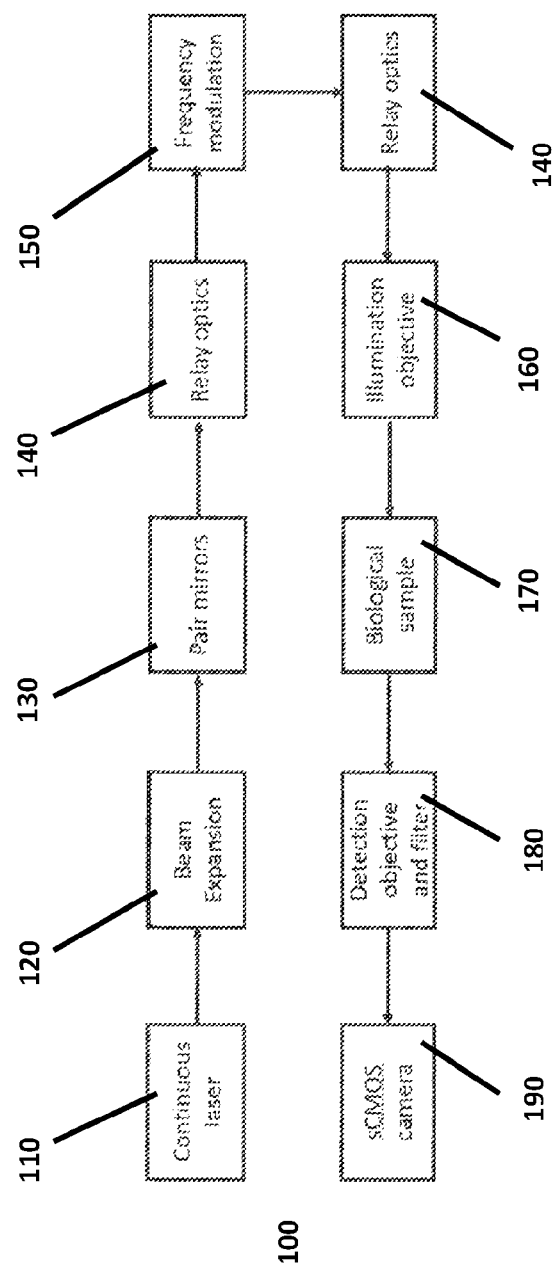
FIG. 1A is a block diagram of an embodiment of the encoded light sheet volumetric imaging device.

FIG. 1A shows a block diagram of an embodiment of the encoded light sheet array volumetric imaging system 100. The light source 110 can be a continuous wave laser or pulsed wave laser. The light beam produced by the light source 110 can be power-controlled, and a beam expander 120 can expand or reduce the beam to an appropriate size. The collimated beam can then be focused along a horizontal direction by a cylindrical lens (not shown) into a misaligned pair of mirrors 130. The beam can then be reflected multiple times between the mirror pair 130 and then light sheets can be retro-reflected to an input port (not shown), where a quarter wave-plate and a polarized beam splitter couples the retro-reflected sheets to the downstream optics. The retro-reflected sheets from the mirror pair 130 can be treated as originating from a series of virtual sources. The light sheets can be transmitted by relay optics 140 towards an encoder 150. The encoder 150 includes but not limited to a frequency modulator that segments the array of incoherent light sheets and encodes each light sheet with a respective frequency, or a temporal modulator that segments the array of incoherent light sheets by an arbitrary orthogonal encoding basis including a Hadamard basis or a random mask. In one embodiment, the frequency modulator includes but not limited to a beam encoder, which is in the form of a moving or rotating spatial light modulator (e.g. a frequency modulation reticle), or a static spatially patterned mask illumination by a scanning light beam. The light sheets can be sectioned by the encoder 150 and encoded with various frequencies or a fundamental basis. The encoded sheets can then be transmitted through the relay optics 140 and focused by an illumination objective 160 onto the biological or non-biological sample 170. The detection objective 180 is placed orthogonally to the illumination objective (not shown). A tube lens in the detection objective 180 can then transmit the fluorescence signal from the sample 170 to a high-speed camera (including but not limited to, a 2D image sensor or a camera 190 such as an sCMOS camera, or an EMCCD camera.

The parallelized discrete light-sheet array illumination also provides another degree of freedom to arbitrarily select any subsets of light sheets. One could implement this user-defined selective plane illumination through a predefined mask included in the relay optics 140 (e.g. a static spatially patterned mask illumination by a scanning light beam or an actively controllable mask using spatial light modulator).

Figure 1B:
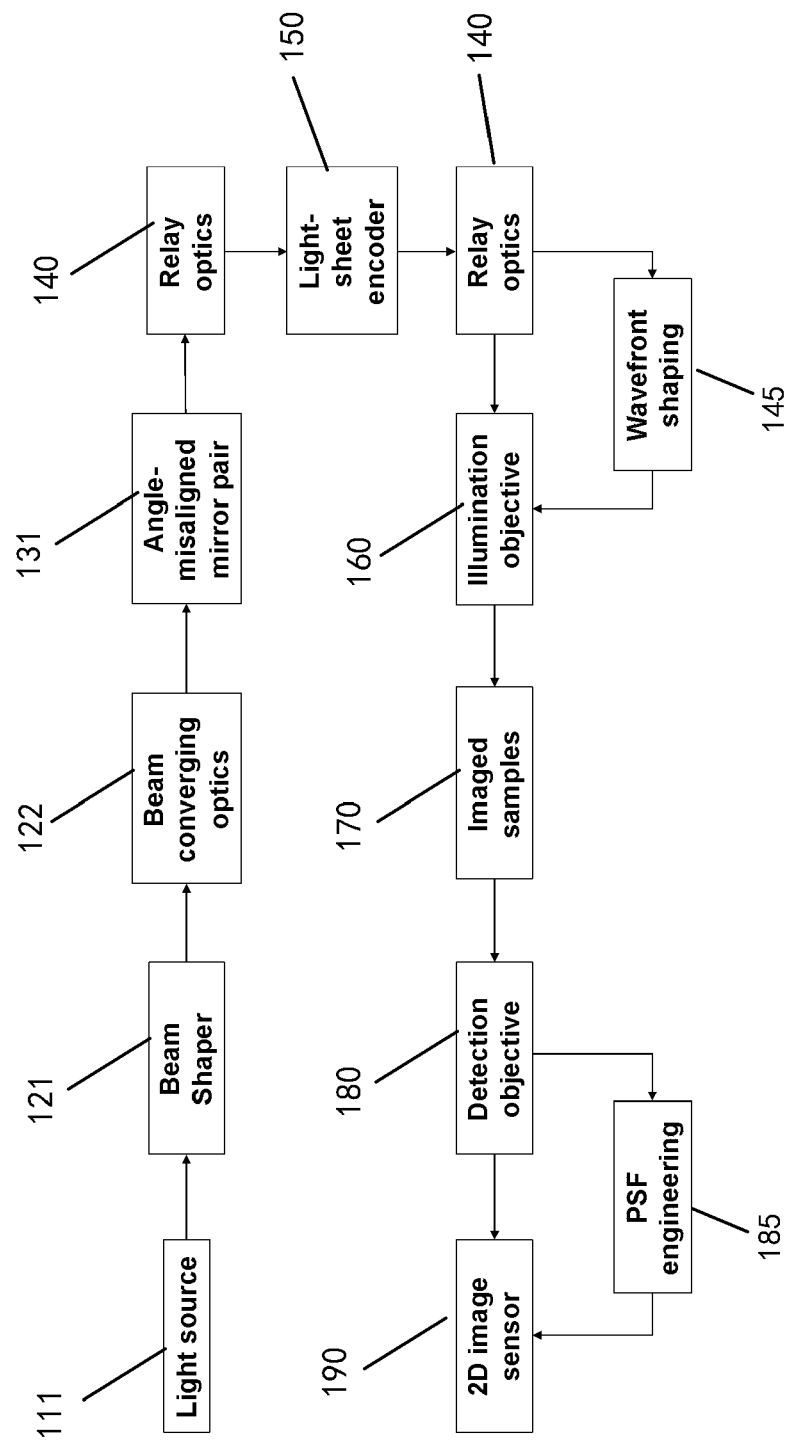
FIG. 1B is a block diagram of an embodiment of the encoded light sheet volumetric imaging device.

FIG. 1B is a block diagram of another embodiment of the encoded light sheet volumetric imaging device. CLAM is a volumetric imaging technique which allows complete parallelized 3D imaging without any mechanical scanning. First, it achieves 3D parallelized illumination by harnessing the concept of "infinity mirror" based on an angle-misaligned mirror pair to generate a light-sheet array that is reconfigurable in both array density and coherency. Regarding parallelized 3D image detection, CLAM implements multiplexed image-plane encoding (by using light-sheet encoder) that ensures optical sectioning without any scanning mechanism, and thus allows fast volumetric frame rate.

Figure 2A:
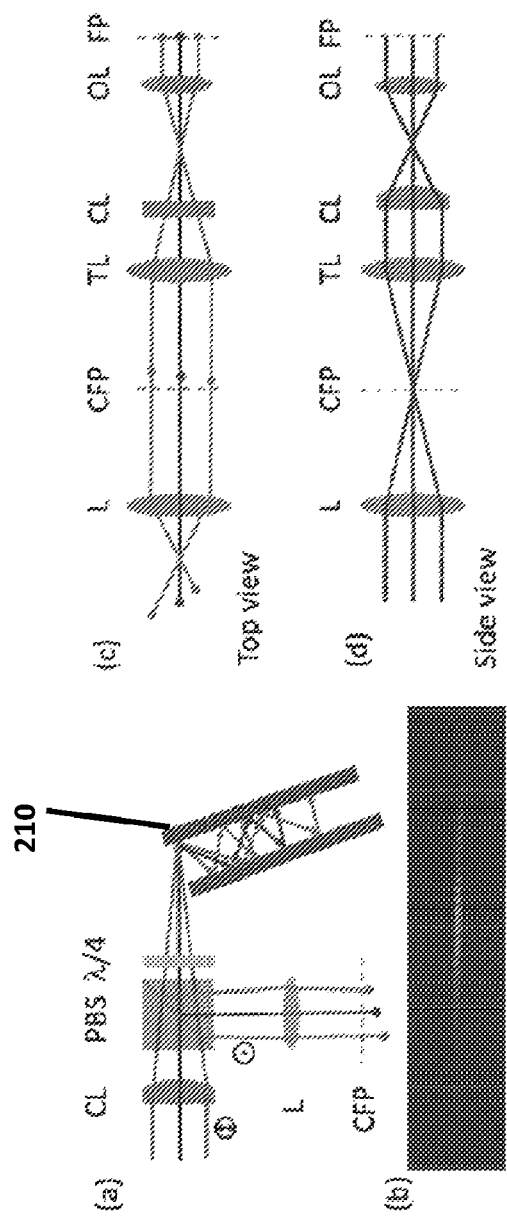
FIG. 2A is a schematic of an embodiment of the CLAM setup.
Figure 2B:
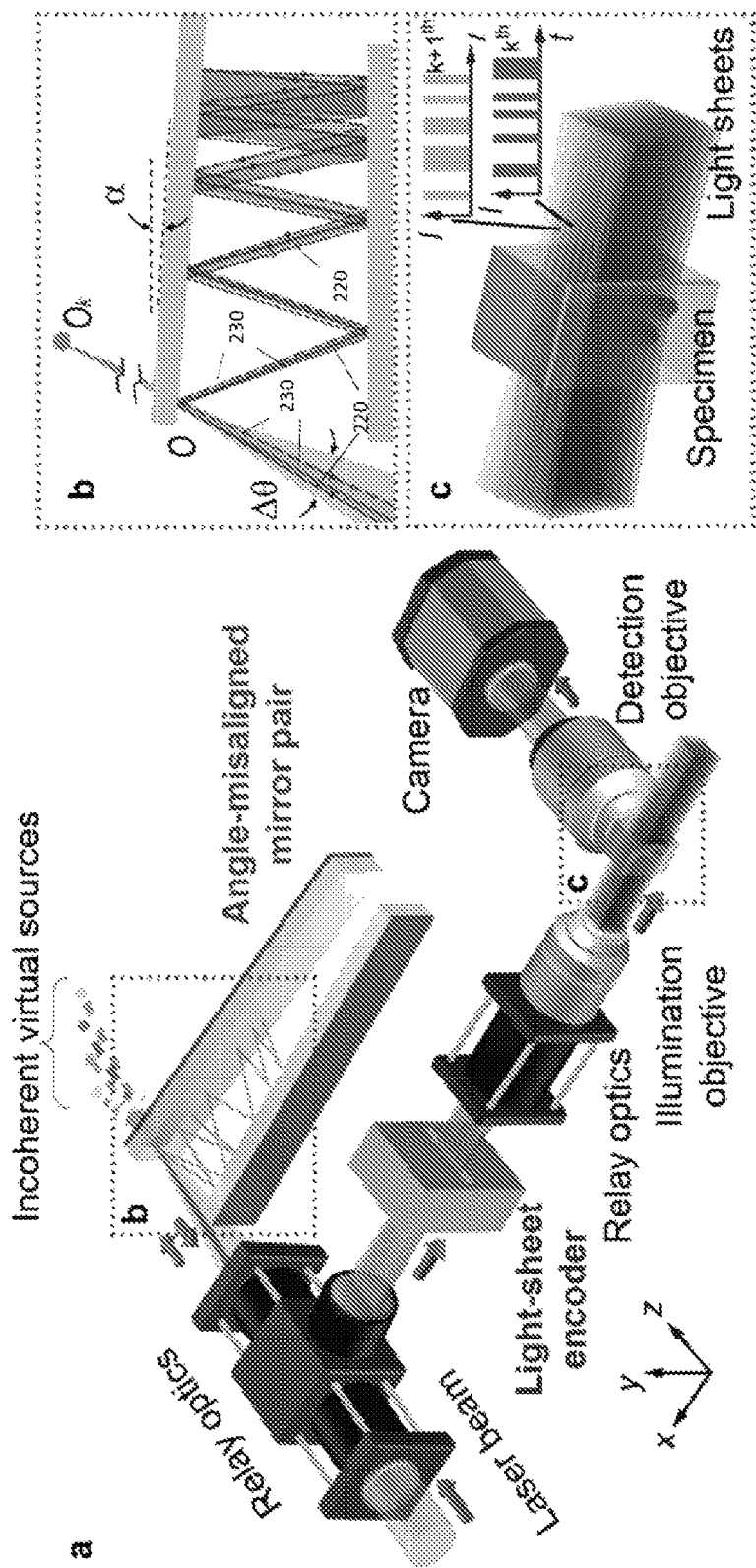
FIG. 2B is a schematic of an embodiment of the CLAM setup.

The inventors harness this unique property that transforms the pulsed laser beam into an ultrafast line-scanning beam using an almost-parallel mirror pair to generate either pulsed or continuous-wave (CW) light-sheet array in which the density and coherency of the light sheets can be flexibly reconfigured by tuning the mirror-pair geometry (e.g., mirror separation S, mirror length L and misaligned angle α) as shown in FIG. 2B.

As shown in FIG. 1B, an input light first passes the spatial beam shaper 121, which can be any type of diffractive optical component(s) (e.g. diffraction grating, spatial light modulators) or microlens arrays, or any type of beam diverging element(s), such as a lens, though embodiments are not limited thereto. The input can be, e.g., directly from a light source 111 free-space output or coupled from light guides, such as optical fibers, though embodiments are not limited thereto. The shaped light beam after the spatial beam shaper is line-focused (i.e. converging in one-dimension) with a cone angle (Δθ) by a beam converging optics 122 and enters into a pair of nearly parallel high-reflectivity mirrors 131 at the entrance O. The beam is then split into a collection of N beamlets (N=Δθ/α)), each of which follows a unique spatially-chirped zig-zag path between two mirrors. Based on ray-tracing, these N discrete light paths, called cardinal modes, are retro-reflected to the entrance O along the identical paths (e.g., the red path 220 in box b in FIG. 2B). On the other hand, the light paths deviated from any cardinal ray (e.g., the blue path 230 in block b in FIG. 2B) can still be routed back, but have a minute lateral shift from the cardinal ray at the entrance O. In effect, for $k^{th}$ returning cardinal ray, there is an accompanying "light fan" as if it is emerged from a virtual source with a very low numerical aperture (<<0.1) located at $O_k$ (box b in FIG. 2B). As a result, all the incoming rays within the incident focusing light cone entering the mirror pair are retro-reflected, transforming into an array of N discrete beamlets, in analogy to rays emerging from an array of N virtual sources (box b in FIG. 2B). The only optical loss is attributed to the mirror reflectivity, which is as high as >99%.

The light sheets can be generated by relay optics 140 towards a light sheet encoder 150. The encoder 150 includes but not limited to a frequency modulator that segments the array of incoherent light sheets and encodes each light sheet with a respective frequency, or a temporal modulator that segments the array of incoherent light sheets by an arbitrary orthogonal encoding basis including a Hadamard basis or a random mask. In one embodiment, the frequency modulator includes but not limited to a beam encoder, which is in the form of a moving or rotating spatial light modulator (e.g. a frequency modulation reticle), or a static spatially patterned mask illumination by a scanning light beam. The light sheets can be sectioned by the light-sheet encoder 150 and encoded with various frequencies or a fundamental basis. The encoded sheets can then be transmitted through the relay optics 140, which could route and select the sub-set of light-sheets to the imaged samples. The sheets can further be transmitted through a wavefront shaping module 145 which augment the imaging performance in terms of resolution and imaging field of view. The light sheets are then focused by an illumination objective 160 onto the biological or non-biological sample 170. The detection objective 180 is placed orthogonally to the illumination objective (not shown). The detected light can be modified by a point-spread-function (PSF) engineering module 185 which could enhance the imaging depth of field. A tube lens in the detection objective 180 can then transmit the fluorescence signal from the sample 170 to a high-speed 2D image sensor or a camera 190 (including but not limited to, a sCMOS camera or an EMCCD camera).

FIG. 2A is a diagram illustrating how the volumetric light microscopy works in one embodiment of the invention. In FIG. 2A, (a) is a diagram of the encoded light sheet volumetric imaging device; (b) is an image of the beam near the common focal plane (CFP); (c) is a diagram of a top view of the optical lenses of the device; and (d) is a diagram of a side view of the optical lenses of the device.

A collimated beam is focused by a cylindrical lens CL along a horizontal direction to form a 1D light cone. The light cone passes through a polarizing-beam splitter PBS and a quarter wave-plate λ/4 before being split by the misaligned parallel mirror pair 210. The retro-reflected beam passes through the quarter wave-plate λ/4 and becomes polarized vertically. A lens L further focuses the modulated beam and creates a linear virtual source array near the common focal plane CFP.

The resulting beams are sectioned by a custom-designed light-sheet encoder 150 such that each of these beams are encoded with a respective modulation frequency or a fundamental basis for each virtual source. The light-sheet encoder 150 includes but not limited to a frequency modulator that segments the array of incoherent light sheets and encodes each light sheet with a respective frequency, or a temporal modulator that segments the array of incoherent light sheets by an arbitrary orthogonal encoding basis including a Hadamard basis or a random mask. In one embodiment, the frequency modulator includes but not limited to a beam encoder, which is in the form of moving or rotating spatial light modulator (e.g. a frequency modulation reticle), or a static spatially patterned mask illumination by a scanning light beam. The frequency modulated beams are then relayed by a microscopy system and a cylindrical lens CL (see, for example, FIGS. 2(c) and 2(d)). Each virtual source forms a planar illumination light sheet on a plane of the biological sample. A detection microscopy objective is mounted orthogonally to an illumination objective and thus orthogonally to each illumination light sheet. Therefore, each illuminated region of the biological sample can be simultaneously detected by a fast array detector.

In general, the detection and the illumination paths can share the same objective and the excitation light-sheets can enter the objective at an angle such that the emission path can still be orthogonal to the illumination light sheets. This dual-objective-lens configuration is compatible with the working principles of a fast volumetric imaging device. This configuration also decouples the excitation path from the detection path, providing additional degrees of freedom to manipulate image quality.

FIG. 2B is a diagram illustrating how the volumetric light microscopy works in another embodiment of the invention. Box a shows a general schematic of the CLAM setup. Box b shows virtual source generation ($O_k$): within the k-th beamlet bouncing between the angle-misaligned mirror pair, all the light rays are subject to 2 k reflections, with slightly different trajectories after the entrance O (e.g., red versus blue rays. Solid blue line: forward path; dotted line: backward path). Box c shows the coded light-sheet array provides parallelized illumination. The fluorescence signals from different depths along the z-direction are tagged with unique temporal codes generated by the light-sheet encoder.

Figure 2C:
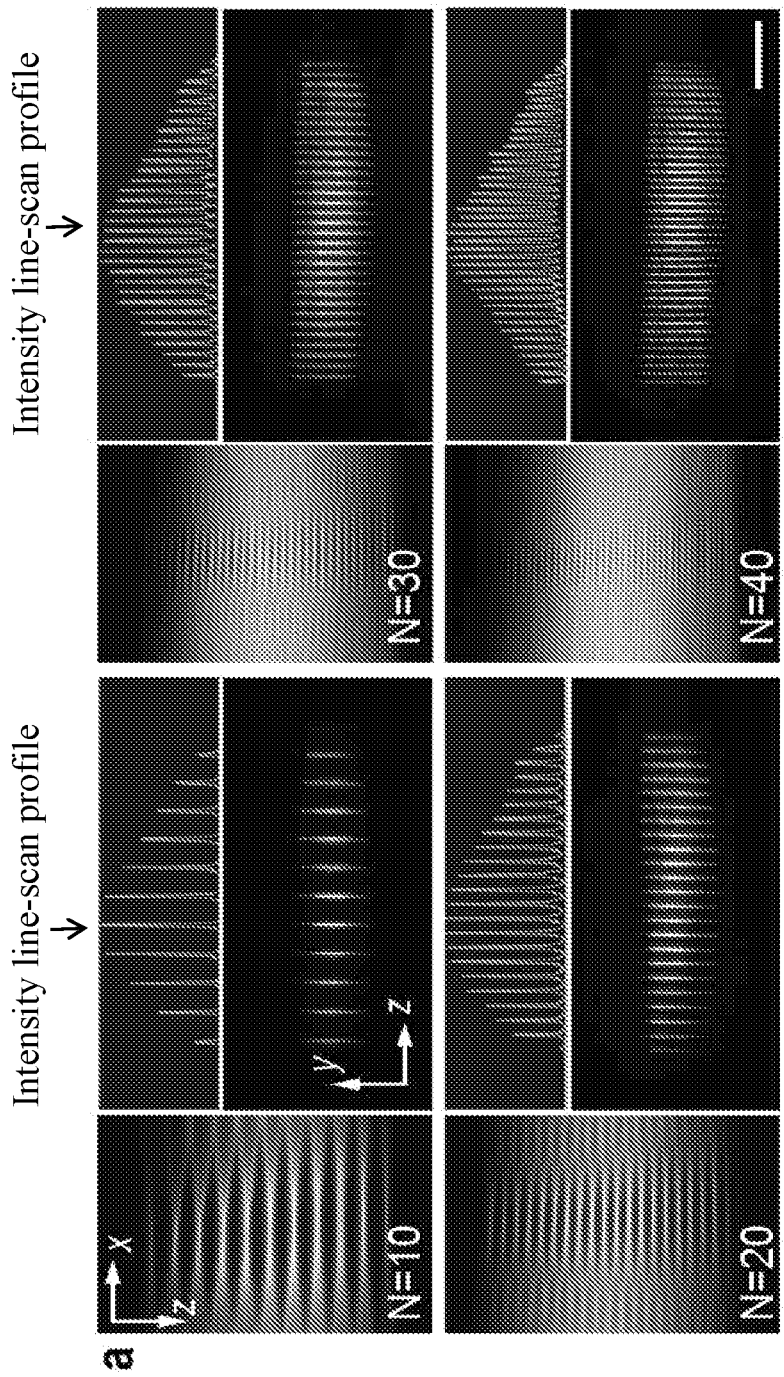
FIG. 2C is measured transverse profiles (along the x-z and y-z planes) of the light sheet arrays (N=10, 20, 30 & 40). The corresponding intensity line-scan profile of each case is shown in blue.

The virtual sources are projected through a relay-lens module to form an array of N light-sheets (Boxes a, c in FIG. 2B). This enables parallelized 3D illumination that removes the need for the beam or objective scanning, thus bypasses dedicated synchronization. The inventor notes that the number of light sheets (virtual sources) N, supported by the mirror pair can be flexibly adjusted by the mirror geometry (e.g., S, α, L), as seen in FIG. 2C. The number of light sheets was chosen according to the imaging specifications (e.g., resolution, FOV, as well as the photon budget), specifically, N was chosen to be beyond 100 light sheets in the experiment. To ensure the intensity uniformity, the M highest-order cardinal modes (M<<N) are selected as CLAM illumination.

FIG. 2C shows measured transverse profiles (along the x-z and y-z planes) of the light sheet arrays (N=10, 20, 30 & 40). The corresponding intensity line-scan profile of each case is shown in blue.

The parallelized discrete light-sheet array illumination also provides another degree of freedom to arbitrarily select any subsets of light sheets. One could implement this user-defined selective plane illumination through a predefined mask (e.g. a static spatially patterned mask illumination by a scanning light beam or an actively controllable mask using spatial light modulator). This could be of particular interest in sparse sampling of neuronal activity recording in brain imaging applications.

Furthermore, the degree of coherence among the light sheets can be flexibly adjusted. While each light sheet itself remains coherent, the incoherency between the light-sheets in the array can be achieved by tuning the mirror separation (S) in such a way that the path-length difference (D) between the virtual sources (i.e., D=2S) is longer than the coherence length of the laser source $L_c$. The inventor's previous work has demonstrated that the path length separation (temporal delay) between adjacent virtual sources can be reconfigured across several orders of magnitude, i.e., millimeters (picoseconds) to meters (nanoseconds). Such controllable incoherency minimizes image artifact and speckle generation, especially in scattered medium.

Figure 2D:
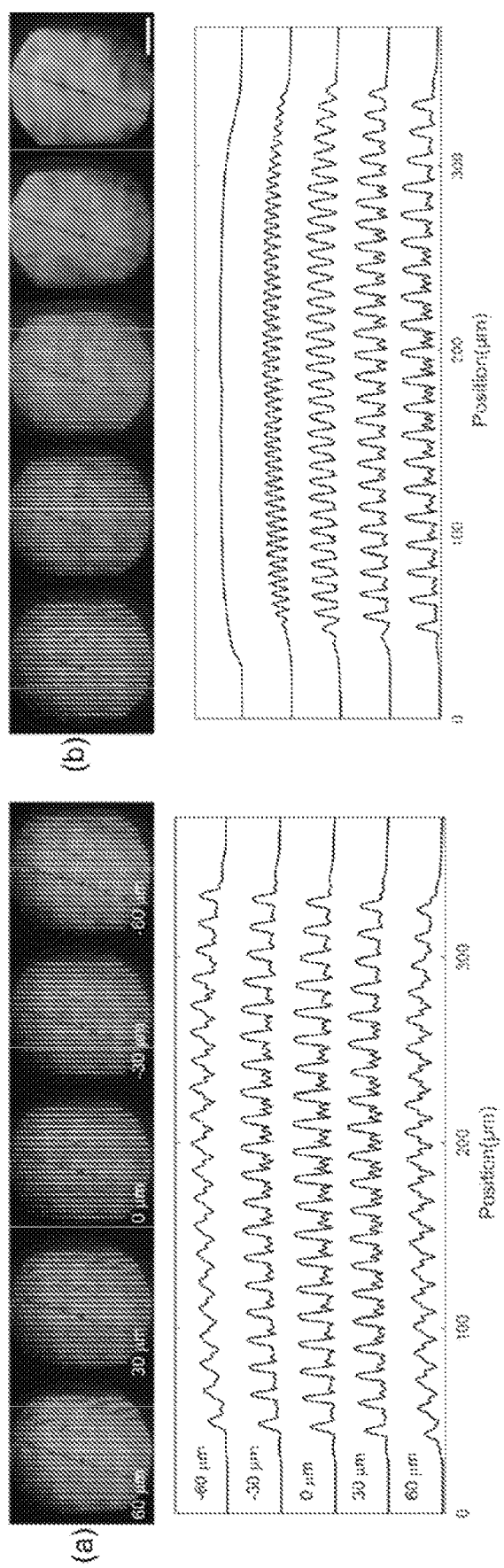
FIG. 2D shows an experimental evaluation of light-sheet array generation in CLAM using another laser source (center wavelength of 710 nm; $L_c$~0.5 mm) with the mirror separation of S~20 mm).

FIG. 2D shows an experimental evaluation of light-sheet array generation in CLAM using another laser source (center wavelength of 710 nm; $L_c$~0.5 mm) with the mirror separation of S~20 mm). (a) The light sheet array profiles at different positions along the propagation axis (x-axis) after the objective lens O1. (b) The changes in light sheet array profiles when the misaligned mirror angle is reduced (from left to right). The bottom panel shows the intensity line-profiles indicated in (a) and (b) (Yellow lines). The Scale bar represents 100 μm for (a) and (b).

In one embodiment, a laser source (center wavelength of 710 nm; $L_c$~0.5 mm) and a mirror pair separation of S~20 mm are employed. This configuration demonstrates uniform intensity profile across the entire light sheet array, as seen in (a), FIG. 2D. The thickness of individual sheets is generally preserved within the Rayleigh range defined by the illumination objective, as seen in (a), FIG. 2D. More importantly, the light-sheet array density can be reconfigured by adjusting the mirror misalignment angle, as seen in (b), FIG. 2D. Note that the incoherent superposition of the light sheets is clearly manifested as smooth illumination profile when the density of the light sheets is so high that individual light sheets are indistinguishable (See the rightmost profile of (b) in FIG. 2D. This is consistent with the fact that the virtual source separation (S~20 mm) is larger than the measured coherence length of the light source ($L_c$~0.5 mm measured from the laser spectrum).

Figure 2E:
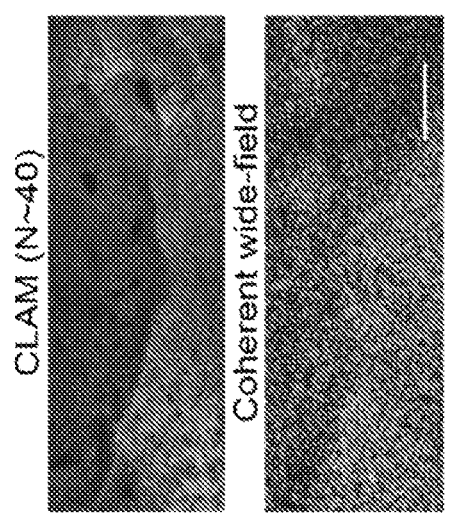
FIG. 2E shows images of a scattered gel sample taken by (top) incoherent CLAM beams (N=40) and (bottom) coherent wide-field illumination.

In another embodiment, the incoherency was further validated in the configuration ($L_c$~4.2 mm, and S~50 mm), which shows a speckle-free light-sheet array illumination distribution through a scattered gel medium. This is in clear contrast to the case of wide-field coherent illumination to the same region, expanded from a single coherent Gaussian laser beam, resulting in the highly speckled patterns as shown in FIG. 2E.

Figure 5:
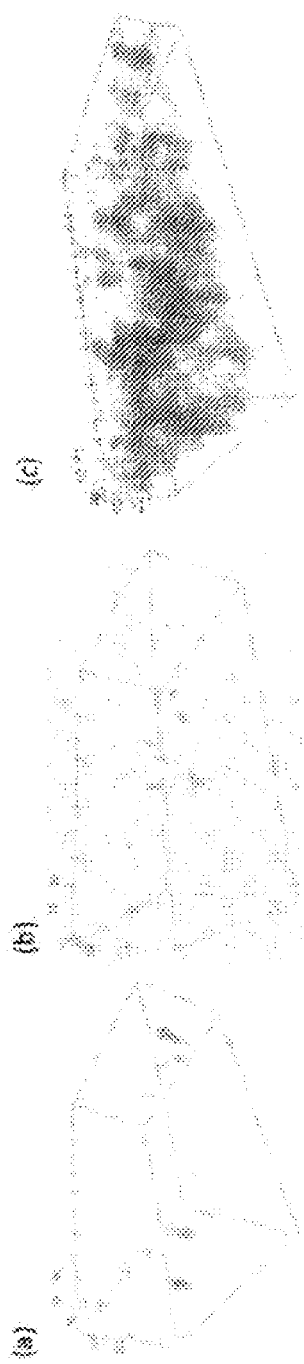
FIG. 5 shows volumetric images of fluorescent microspheres embedded in a 2% agarose gel at different illumination depths.

In contrast to conventional LSFM devices, the fast volumetric imaging device removes the need for beam, objective, specimen scanning, and reduces the physical strain on the samples/system. FIG. 5 shows volumetric images of a tissue-mimicking phantom made from 1 μm diameter polystyrene spheres coated with Nile red fluorophore and imbedded in a 2% Agarose gel with $TiO_2$ nanoparticles. The $TiO_2$ nanoparticles are of a concentration of 1.2 mg/ml to imitate the scattering effect of a human breast tissue. FIG. 5(a) shows a volumetric image when the illumination beam is set to a penetration depth of 30 μm. FIG. 5(b) shows a volumetric image when the illumination beam is set to a penetration depth of 100 μm. FIG. 5(c) shows a volumetric image when the illumination beam is set to a penetration depth of 300 μm. The fast volumetric imaging device can image the fluorescent beads at a penetration depth as large as 200 μm. As seen by FIG. 5(c) the fluorescent beads are visible at a penetration depth of 300 μm, but with a decrease in the signal-to-noise ratio.

The fast volumetric imaging device implements a pair of highly reflective mirrors (R>99%) to create mutually incoherent virtual sources, each of which produces a light sheet. The produced light beams of a light sheet are mutually incoherent with each other. The mutual incoherence makes it possible to image minute structures, even when the structures are embedded in tissues that induce strong scattering effects; and with minimal crosstalk between light beams. The two reflective mirrors split the beam into a series of virtual sources, which are then converted to a light sheet array. In contrast to conventional light sheet microscopy devices, this device does not require scanning optics for illuminating the biological sample in 3D, and thus this device provides higher and longer-term mechanical stability.

The fast volumetric imaging device temporally modulates each light sheet to encode each sheet with a respective frequency. A series of relay optics are used to conjugate the light sheets to a custom modulation mask that provides a series of modulation frequencies. This process encodes each light sheet with a respective modulated frequency.

The fluorescence signal from the biological sample can be demultiplexed off-line. The fluorescence signal can be flexibly manipulated by a time-multiplexing, a frequency-multiplexing scheme, a random basis, or a Hadamard transform scheme to enable high-speed image acquisition. This feature is uniquely leveraged by temporal modulation, which is not found in existing commercial frequency chopper systems.

Figure 3:
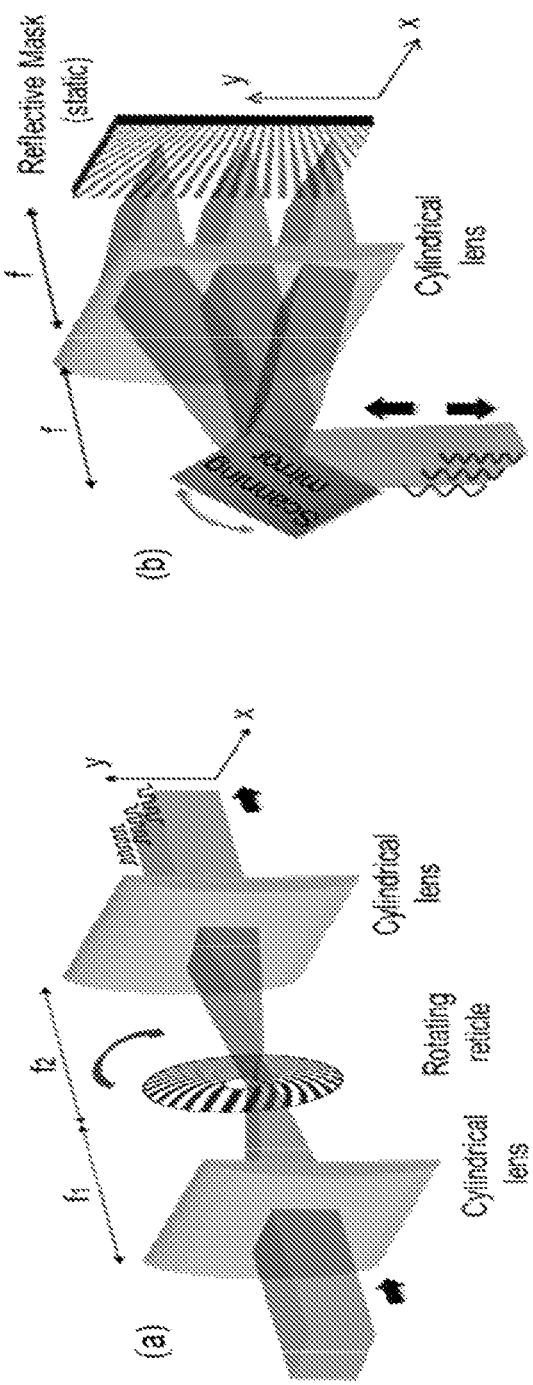
FIG. 3 shows diagrams of implementations 3D multiplexing of the light-plane illumination array.

Another feature of the fast volumetric imaging device is 3D multiplexing, based on either FDM or CDM, as seen in FIG. 3. In general, the $k^{th}$ 2D image plane $I_k(x,y)$ across the 3D stack (z-direction) is temporally modulated with a unique code $m_k(t)$. A 2D image sensor is used to simultaneously capture all of the 2D planes. Mathematically, the captured 2D raw data can be expressed as: $I(x,y,t)=\Sigma I_k(x,y) \times m_k(t)$. The summation sums over all k. For a FDM based method, the code is sinusoidal modulation (e.g., $m_k(t)=\cos(2\pi f_k t)$, where $f_k$ is the modulation frequency assigned to the $k^{th}$ plane). The frequency-encoded planes can be demultiplexed using a Short-Time Fourier Transform (STFT). The entire 3D FOV I(x,y,z) can then be reconstructed. The maximum modulation frequency $f_{max}$ is limited by the camera's 2D frame rate $f_{cam}$, or more precisely the relation $f_{max} \leq f_{cam}/2$, according to the Nyquist sampling criterion. For FDM, the number of resolvable optically-sectioned planes N is limited by the number of resolvable frequencies and should be $N \geq 2M = f_{cam}/f_{3D}$, where $f_{3D}$ is the 3D frame rate. When N is in a range of 100-120 resolvable planes, a high-speed 3D imaging rate of $f_{3D}$=12–20 Hz can be achieved using a high-speed sCMOS camera ($f_{cam}$=2400 Hz). The 3D imaging rates of the fast volumetric imaging device increase along with continuing advances in sCMOS camera technology. Note that the coding nature innately offers optical sectioning across a 3D stack. Due to 3D multiplexing, the fast volumetric imaging device can minimize photobleaching and/or phototoxicity compared to point-scanning microscopy or LSFM techniques.

For CDM, the codes, $m_k(t)$, assigned to each 2D plane can be Walsh Hadamard (WH) codes (or error correcting orthogonal codes, or pseudo-random noise (PN) sequences that are deterministic binary sequences appearing to be random noises). Multiplexing based on both types of codes (i.e., spread-spectrum modulation) are resistant to noise and favorable for high signal fidelity in a communication system.

The fast volumetric imaging device can also be used for 3D volumetric fluorescence light sheet imaging for inspection in biomedical and clinical applications (e.g., developmental biology, cell biology, high-volume manufacturing inspection, industrial applications for high-throughput volumetric quality control, and very-large scale integration (VLSI) semiconductor devices).

A conventional confocal microscopy device illuminates a biological sample with a focused beam with a power density on the order of tens of MW/cm$^2$. The fast volumetric imaging device has a power density about 6 orders of magnitude smaller than a conventional device. The reduced power density reduces photo-bleaching and cytotoxicity associated with the exogenous fluorescent labels; and reduces photo-damage to a biological sample. Conventional microscopy techniques, (e.g., wide-field, and confocal), also introduce more radiation to the biological sample than the fast volumetric imaging device. The device produces less radiation by only illuminating the imaging plane on the biological sample, which minimizes photo-damage and photo-toxicity.

The fast volumetric imaging device can realize high-speed volumetric imaging without scanning the light sheets due to variable frequency modulation of each light sheet. The temporal modulation of the volumetric fluorescence signal permits the signal to be demultiplexed in the frequency domain. The virtual light sources can be imaged onto a variable frequency modulator controlled by a lock-in drive. The temporally modulated light beams can then be converted to individual light sheets under a microscope objective to illuminate the biological specimen.

Figure 3A:
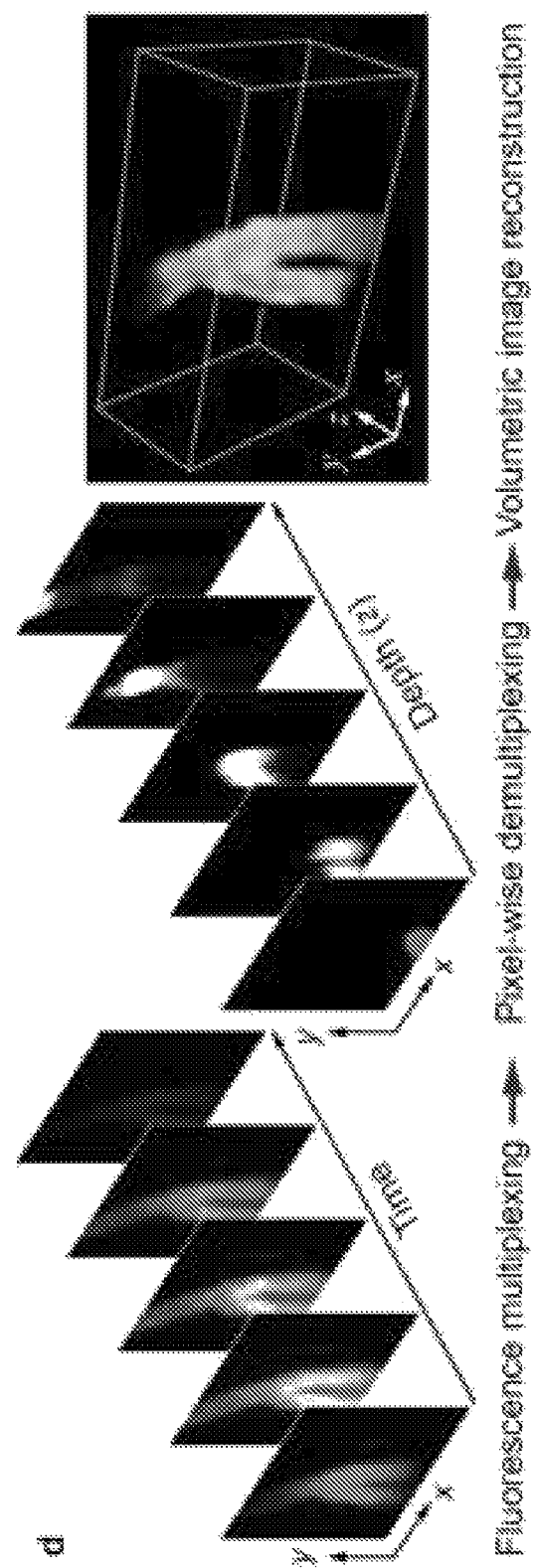
FIG. 3A shows an exemplified workflow of image reconstruction of CLAM based on frequency-division multiplexing (FDM) encoding.
Figure 3B:
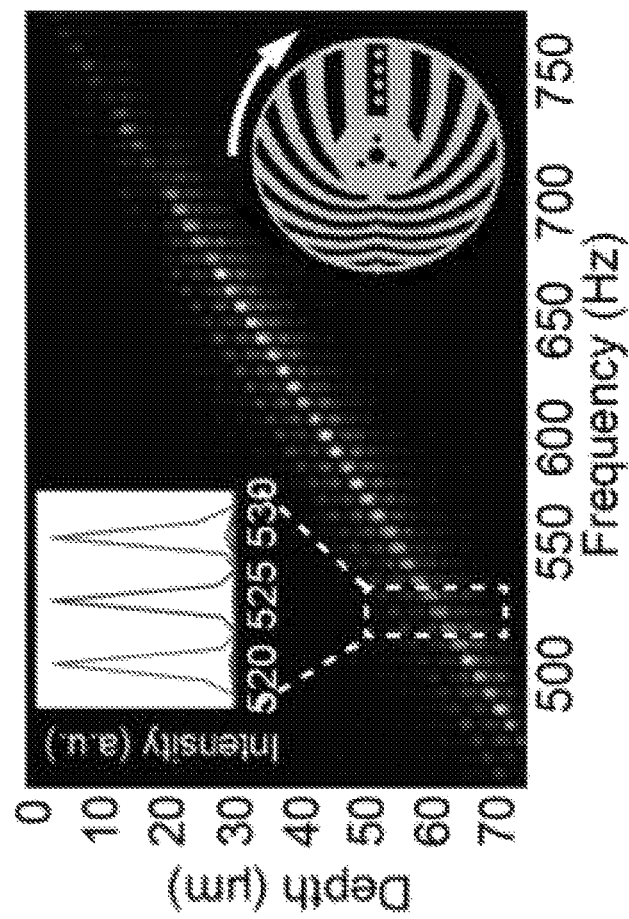
FIG. 3B is the frequency-to-depth map showing the linear relation between encoding frequencies and the depth (N=40). Minimal cross-talk is observed between individual light-sheets (frequency channels) (upper left inset). (Lower inset) The schematic of the spinning reticle (i.e., light-sheet encoder), and the projected virtual sources (green dots). The scale bars represent 50 μm.

Parallelized volumetric detection in CLAM is accomplished by multiplexed light-sheet encoding. This can be implemented by intensity modulation of the light-sheet array projected onto a spatial modulation mask, which could be a spinning patterned reticle/mask, or static patterned mask with a scanning beam; or an actively reconfigurable patterned mask, e.g. a spatial light modulator (SLM) with a scanning line-beam, as seen in FIG. 3. FIG. 3(a) shows that laser is modulated with a rotating reticle, which is positioned at the common focal plane of a 4f system formed by two cylindrical lenses. FIG. 3(b) shows that the laser is modulated by scanning the 1D focused beam across the static reflective mask (i.e., liquid-crystal SLM, or digital micromirror devices (DMD)). Both approaches can encode the beam with different codes (e.g., modulating frequencies in FDM, or PN/WH code in CDM) along one dimension (x-direction) that is later mapped to different light-planes/light-sheets in 3D stack of illumination array.

Accordingly, the fluorescence signal from the k-th section $I_{em}(x,y,z-z_0k)$ is intensity-modulated with a unique temporal code $m_k(t)$(box c in FIG. 2B), with $z_0$ the adjacent light-sheet separation. The orthogonal detection objective collected the multiplexed fluorescent emission, which is registered on a 2D image sensor. The 2D raw data taken by the camera can be represented as, $$I_{cam}(x, y, t) = \sum_{k=0}^{N-1} m_k(t) \cdot \int_{-\infty}^{+\infty} I_{em,k}(x, y, z - z_0 k) dz \quad (1)$$

The image, with minimal cross-talk among planes, can faithfully be recovered when the orthogonality of the codes is satisfied. The coding can be, but not limited to frequency-division multiplexing (FDM) and coded-division multiplexing (CDM). The signal is encoded with a unique carrier frequency in FDM whereas a pseudo-random code sequence in CDM. In CDM, the code $m_k$(t) assigned to each 2D plane can be the Walsh Hadamard (WH) codes, which are error correcting orthogonal codes; or the pseudo-random noise (PN) sequences, which are deterministic binary sequences appearing to be random noises.

Inspired by the orthogonal frequency division multiplexing (OFDM) in wireless communication networks, one embodiment can modulate the light sheets with $m_k(t)=\cos(\omega_k t)$, where $\omega_k$ is the depth-dependent modulation frequency of the k-th light sheet. The frequency carriers satisfy the orthogonality property over a period T, i.e., $<m_i(t), m_j(t)>=\delta_{ij}$, where $\delta_{ij}$ is a delta function, and $<*>$ refers to the inner product. Therefore, 2D sections at different depths are tagged with distinguishable modulation frequencies and are multiplexed into a single 2D frame sequence registered on the image sensor (FIG. 3A). By applying short-time Fourier transform on the 2D image sequence $I_{cam}(x,y,t)$, $$\tilde{I}_{cam}(x, y, \omega) \propto \sum_{k=0}^{N-1} \delta(\omega - \omega_k) \cdot I_{em,k}(x, y) \text{ where } \tilde{I}_{cam}(x, y, \omega) \quad (2)$$

where $\tilde{I}_{cam}(x,y,\omega)$ denote the temporal Fourier transforms of $I_{cam}(x,y,t)$. In contrast to the existing frequency-multiplexed imaging approaches, CLAM multiplexes 2D image stacks to enable parallelized 3D imaging by frequency-chirped intensity modulation across the light-sheet array. FIG. 3B exemplifies the image multiplexing and demultiplexing steps, and the volumetric image of a branching blood vessel could be rendered from the demultiplexed image sequence.

The design rationale of the reticle pattern is generally guided by two key specifications that critically determine the CLAM performance. First, the modulation frequency separation between adjacent light-sheets ($\Delta f$) defines the volumetric imaging rate ($f_{vol}$), i.e., $f_{vol}=\Delta f$. Furthermore, in order to ensure the best achievable axial resolution, $\Delta f$ should also be chosen such that the associated spatial separation between encoded frequency channel (i.e., $\Delta d=\beta\Delta f$, where $\beta$ is the calibrated conversion factor between depth and frequency), is kept equivalent or smaller than the thickness of each light sheet ($w_{LS}$), i.e., $\Delta d<w_{LS}$. Second, governed by both the Nyquist sampling criterion and the camera frame rate, the total modulation frequency range (BW) allowed to encode all light-sheets determines the number of light sheets (i.e., N). Following the Nyquist criterion, the upper limit of the modulation frequency ($f_H$) should be lower than half of the camera frame rate ($f_{cam}$), i.e., $f_H<f_{cam}/2$. (At fast mode, set at $f_H\sim1400$ Hz$<f_{cam}/2$). On the other hand, the lower limit of the modulation frequency ($f_L$) should stay above half of the upper frequency limit, i.e., $f_L>f_H/2$, in order to eliminate cross-talk from the high-order harmonic oscillation. For a given frequency bandwidth, i.e., BW=$f_H-f_L$ (set by the design of the reticle and spinning speed), the number of frequency "channels", or equivalently the number of light sheets (N) that can be allocated is N=BW/$\delta f$=BW/$f_{vol}$. Hence, CLAM could faithfully generate N~20-70 light sheets to achieve a 3D imaging rate of $f_{vol}$=1~20 vol/sec. While such volume rate is comparable to the state-of-the-art scanning-based LSFM platforms and matches the speed required in many biological imaging applications, the multiplexing nature in CLAM further improves the sensitivity as all the voxels in the volume are read out in parallel (i.e., 100% spatial duty cycle)—increasing the effective voxel dwell time by the factor of multiplexing numbers (N), without compromising the volume rate. Given this improvement, CLAM also reduces the illumination power and thus photobleaching and phototoxicity. The inventors note that given a shot-noise limited condition, this sensitivity improvement in principle scales with sparsity of the fluorescent sample because multiplexing inherently distributes the shot noise across all the 2D stacks.

In one embodiment based on FDM encoding scheme, by applying short-time Fourier transform on the temporal signal pixel-by-pixel, a frequency-depth map from the CLAM system is generated, which shows a clear linear relationship ($R^2=0.995$, a slope of $\beta=0.23$ μm/Hz) between the encoded depth and the modulation frequency (N=40), as seen in FIG. 3B. This is in concordance with the reticle design which generates a linear frequency-chirp across the beamlet array (See Supplementary Information). Individual decoded light sheets, with an averaged thickness of ~1.5 μm, as seen in FIG. 3B, are tagged with the distinctive center frequencies between 450 Hz and 750 Hz, and are consistently associated with the finite bandwidth (~3 Hz). The averaged SNR over all frequency channels is >5 dB with minimal cross-talk between neighboring channels as corroborated in the frequency-depth map. The inventor notes that the residual side-lobes in each frequency channel is mainly attributed to the mechanical jitter and wobble of the spinning reticle. Besides applying shot-time Fourier transformation, other decoding scheme such as digital quadrature decoding or arctangent decoding method could also be implemented to reduce the noise introduced during the modulation stage and further decrease the required length of the signal, and therefore increase the volume frame rate.

Embodiments of the subject invention can be used to produce a volumetric imaging video of the biological sample without mechanical/electrical scanning. Compared with existing light sheet microscopy techniques that scan either the illumination light sheet or the sample stage, the herein described techniques minimize the effect of stage drift and photo-damage. The non-scanning coded light sheet microscopy of the subject device can capture a volumetric image video of a fluorescent sphere in the microfluidic flow at a flow rate of approximately 16 μm/sec. The captured volumetric frame rate can be as high as 25 vol/sec. The volumetric flow rate can be further increased with a higher camera speed. This makes the techniques faster than conventional scanning techniques or structured beam light sheet microscopy. The techniques minimize the use of expensive and complex beam control devices, such as a spatial light modulator, an acousto-optic deflector, and a piezo-stage. Therefore a volumetric image can be produced without additional complex control mechanisms and so the beam distortion can be minimized.

Figure 9:
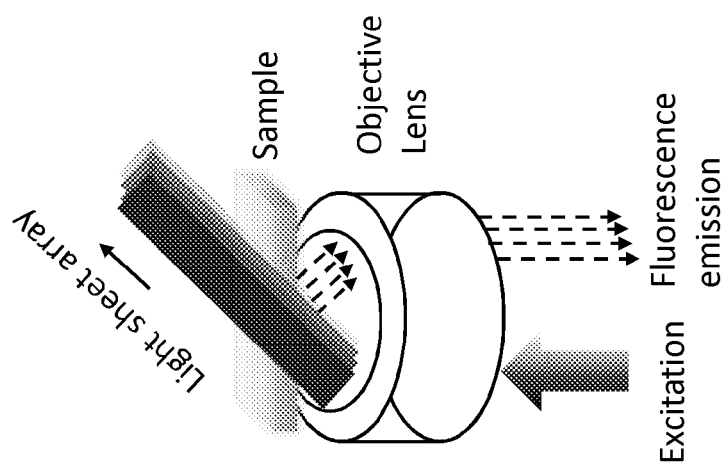
FIG. 9 shows single-objective-lens configuration of CLAM. The same objective lens generates oblique light-sheet array illumination and collect the fluorescence signals.

In one embodiment, CLAM can be implemented in either dual-objective-lens or single-objective-lens approach. In the dual-objective-lens configuration, two separate objective lenses, which are orthogonal to each other, are used for illumination and fluorescence detection, respectively. Based upon this scheme, simultaneous multi-view CLAM can also be implemented by delivering the light sheet array from multiple direction—an effective strategy proven to improve the image quality in the presence of light scattering and resolution isotropy; In a single-objective-lens configuration, the same objective lens generates oblique light-sheet array illumination and collect the fluorescence signals, as seen in FIG. 9.

Figure 10:
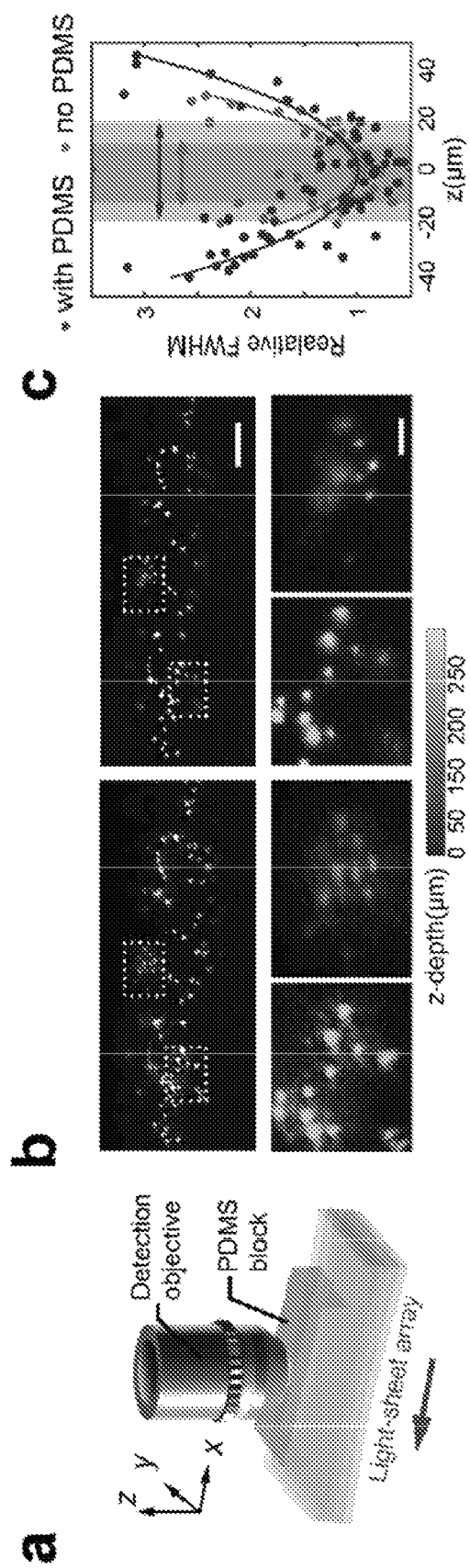
FIG. 10 shows implementations of the invention with wavefront coding/shaping in order to manipulate the FOV in both axial and lateral dimensions.

FIG. 10 shows that the invention can be implemented with wavefront coding/shaping in order to manipulate the FOV in both axial and lateral dimensions. Picture a in FIG. 10 shows an implementation of extended depth-of-field (DOF) based on induced spherical aberration, that is implemented by placing a PDMS block between the sample and the detection objective. Picture b in FIG. 10 shows a comparison of the DOF between the CLAM images taken with and without the PDMS block. The scale bars represent (top) 50 μm and (bottom) 20 μm. Picture c shows measured full-width-half-maximum (FWHM) (relative to the minimal value) of the PSF along the depth (z) in the cases of (red) without and (blue) with the PDMS block. The solid curves are the quadratic fit. The DOF is extended by ~32% in presence of the spherical aberration.

In one embodiment, one can harness the spherical aberration to extend the depth-of-field (DOF). This is essentially the step of PSF engineering, through the wavefront coding (WFC) 145 shown in FIG. 1B. This was made possible by introducing a block of high refractive index material (Polydimethylsiloxane (PDMS) with the refractive index of n=1.42; thickness of 5 mm), between the sample and detection objective (a. in FIG. 10). In the presence of high-refractive index medium, fluorescent emission light rays, especially the peripheral rays will be focused on different points along the depth axis, and thereby creating a sizable but uniform spherical aberration. This effectively extends the DOF without significantly degrading transverse resolution (b. in FIG. 10). The inventor experimentally measured the FWHM of the PSFs across the FOV for the two cases: i.e., with and without extended DOF (b. in FIG. 10). In comparison, the point spread function (PSF) without extended DOF, broadens more rapidly along the axial direction. Defining the DOF as the range within which the FWHM is maintained within $\sqrt{2}$ of the minimum achievable FWHM, the inventor observes the current configuration could yield ~32% extension in DOF (i.e., the axial FOV is extended from 31 μm to 41 μm (c. in FIG. 10). In another embodiment, one could also further apply PSF engineering techniques involving non-diffracting illumination beam, using e.g., the axicon, cubic phase mask or tunable acoustic gradient-index lens in order to scale the DOF.

Figure 11:
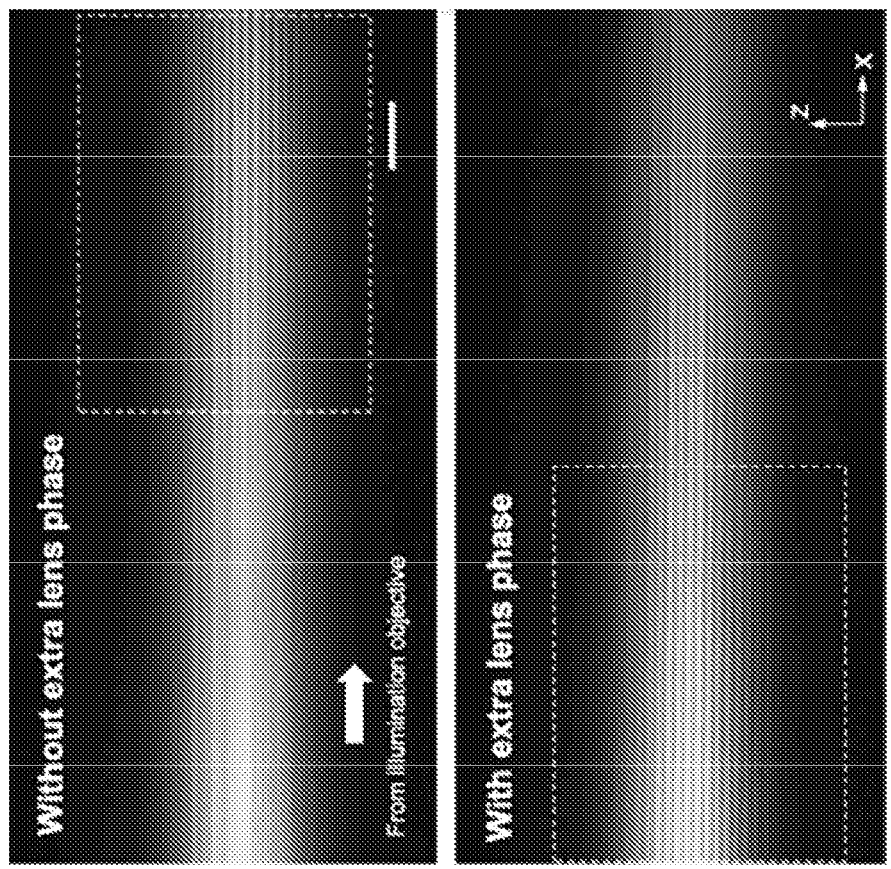
FIG. 11 shows "light-sheet-array tiling" using a spatial light modulator (SLM) for expanding the FOV. (Left) A schematic of the setup. The SLM, located at the Fourier plane of the image place, imposes a binary lens phase map on the light beam after the FACED mirror pair. (Right) The light sheet array profiles (bottom) with and (top) without the lens phase applied on the SLM. Scale bar: 50 μm.
Figure 11:
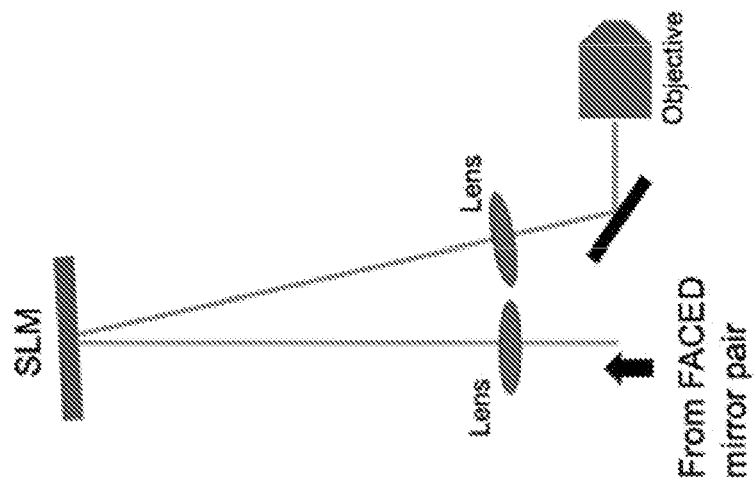

In another embodiment, the lateral FOV can be extended by adopting wavefront shaping (See wavefront shaping 145 in FIG. 1B) e.g. remote focus technique that could be used for light-sheet tiling or Bessel beam generation. In the case of "light-sheet-array tiling", one can employ spatial light modulator (SLM) which imposes the binary spherical phase pattern onto the light-sheet array generated by CLAM. Hence, the entire array of light sheet illumination can be shifted quickly along x direction, as seen in FIG. 11.

Figure 6:
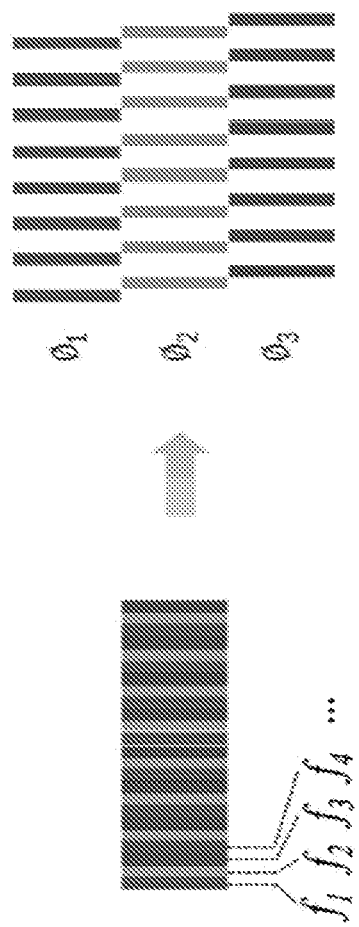
FIG. 6 is a diagram illustrating the improvement to the axial resolution by digital structure illumination.

Another feature of the fast volumetric imaging device is the ability to perform digital structured illumination along the axial direction (i.e., improving the resolution isotropy). Using FDM techniques, the frequency-encoded nature of each 2D plane can be leveraged to digitally select a subset of the 3D stack (using the light-sheet encoder 150 or another predefined mask included in the relay optics 140 shown in FIGS. 1A and 1B) to form an axially-modulated 3D image (e.g., taking every other two planes and form a 3D image with a periodic stripe-pattern along the axial dimension, as seen in FIG. 6). By selecting subsets that each have a respective phase shift, a high-resolution image can be reconstructed across the axial dimension. By over-sampling the 3D stack along the axial dimension, three subsets of 3D stacks (red, greed, and blue) can be digitally selected because each 2D plane is encoded. Each subset resembles the image captured by a periodic structured illumination, each having a fixed phase ($\Phi_1$, $\Phi_2$, $\Phi_3$). Having the three image subsets, their frequency spectra can be re-positioned such that the passband of the final image is expanded, i.e., resolution is improved.

The axial modulation period should be slightly smaller or equal to the theoretical resolution limit in order to gain higher resolution. The multiple structured images can be obtained simultaneously instead of sequentially as in typical SIM because the frame rate is not compromised for higher resolution. If desired, the fast volumetric imaging device can be modified to work in SIM-mode to perform resolution isotropy.

FIG. 6 shows a digital structure illumination in CLAM based upon FDM encoding. By over-sampling the 3D stack along the axial dimension, three subsets of 3D stacks (red, green, and blue) could be digitally selected because each 2D plane is encoded (here is frequency-encoded with $f_1$, $f_2$, $f_3$, $f_4$ and so on). Each subset resembles the image captured by a periodic structured illumination, each having a fixed phase ($\Phi_1$, $\Phi_2$, $\Phi_3$). Having the three image subsets, their frequency spectra are re-positioned in a way that the passband of the final image is expanded, i.e. resolution is improved. This is essentially identical to the usual imaging processing adopted in SIM.

The invention is applicable to multi-color fluorescence imaging which can be realized by using multiple laser (pulsed and continuous wave (CW)) wavelengths, including but not limited to the wavelength range from ultraviolet to near infrared (depending on the excitation spectra of the fluorophores) and one or more 2D image sensors for image detection. The light at different wavelengths can be combined by dichroic filter or an acousto-optic tunable filter (AOTF), and can be delivered to the mirror pair using the same optics. CLAM is also applicable to multiphoton imaging, where the excitation light is short-pulsed laser (typically femtoseconds). This includes, but not limited to two-photon, and three-photon fluorescence volumetric light sheet microscopy.

CLAM can also perform digital structured illumination along the axial direction—improving the resolution isotropy. In one embodiment, based on FDM as an example, one can leverage the frequency-encoded nature of each 2D plane and digitally select a subset of the 3D stack to form an axially-modulated 3D image (e.g. taking every other two planes and form a 3D image with a periodic stripe-pattern along the axial dimension, as shown in FIG. 6). By selecting other subsets of periodic 3D stack, each having a phase shift with respect to each other, one can computationally reconstruct a high-resolution image (across the axial dimension) based on these subsets—similar to the algorithm employed in structured illumination microscopy (SIM). The axial modulation period should be slightly smaller or equal to the theoretical resolution limit in order to gain higher resolution. Note that, the multiple structured images are obtained simultaneously, instead of sequentially as in typical SIM—i.e., the frame rate is not compromised for higher resolution.

Exemplified Embodiments

Figure 12:
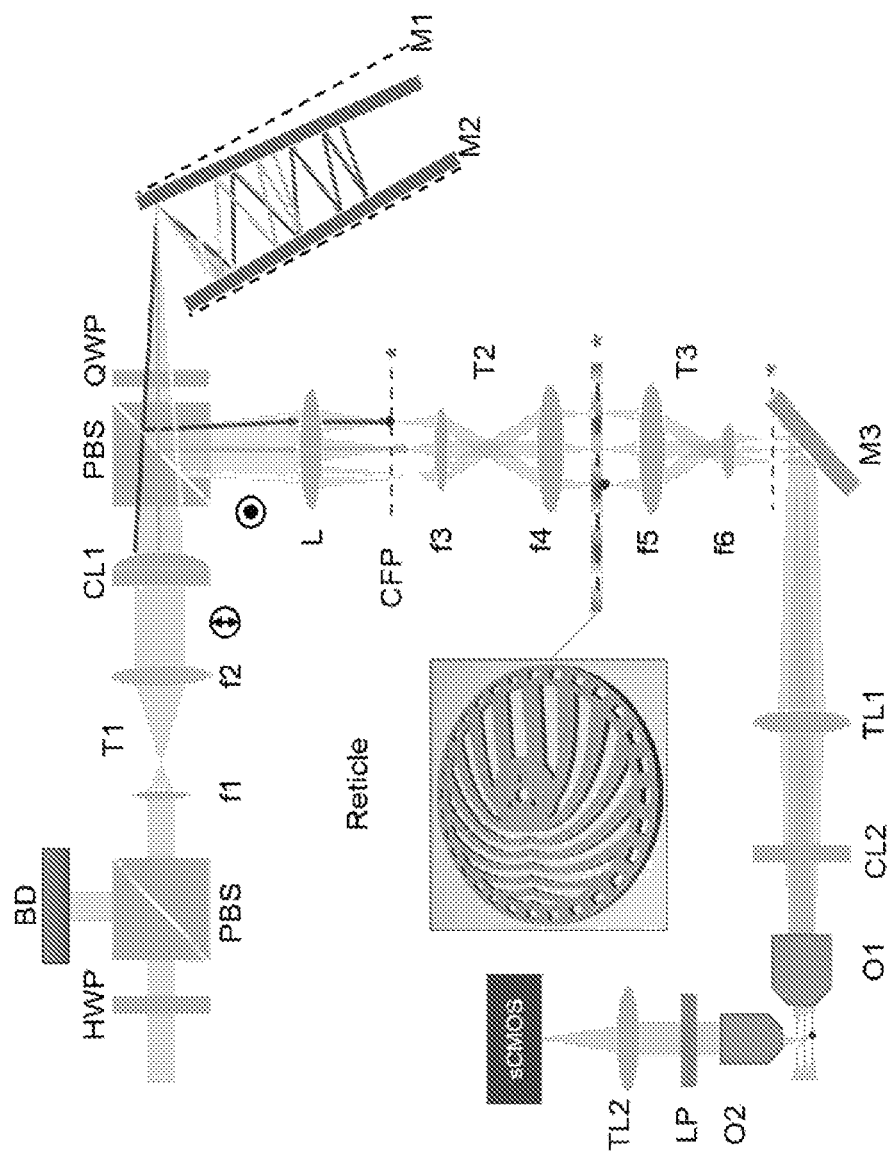
FIG. 12 shows a system layout of CLAM. M, mirrors, f, lenses, L, lens, PBS, polarizing beam splitters, λ/2 half-wave plate, λ/4, quarter-wave plate, (CL1 and CL2), cylindrical lenses, (T1, T2, and T3) telescopes. (O1 and O2), objective lenses, LP, long pass filter. Double arrow (dot) in circle shows horizontal (vertical) polarization. Positions labeled with red asterisks are conjugated planes of the virtual sources.

The collimated beam from a diode-pumped solid-state laser (CW, wavelength, 532 nm, power, 400 mW) was line-focused by cylindrical lens ($f_{CL}$=200 mm) into the angle-misaligned mirror pair (Reflectivity R>99%; separation S=50 mm; length L=200 mm) at the entrance O. The beam breaks into a discrete set of (spatially-chirped) zig-zag paths governed by their incident angles. The number of beamlets N was mainly controlled by the misalignment angle, the light cone angle and a variable slit (N was chosen to range from 30 to 70). This beam was collected by a lens (f=200 mm) and relayed through a telescope T2 (2× magnification) onto the spinning reticle (i.e., the light-sheet-array encoder based on OFDM), followed by another telescope T3 (¼ magnification) to match the FOV. All the virtual sources are imaged on the planes in the proximity of the common focal plane (CFP) of L and T2. This configuration essentially ensures that all the virtual sources are imaged within the DOF of the illumination objectives (FIG. 12). The beam passes an illumination tube lens TL1 (f=200 mm) and a cylindrical lens CL2 (f=50 mm) and then is focused by an illumination objective O1 (20×, NA=0.45, W.D., 8.2-6.9 mm) to generate the light-sheet array. The orthogonal detection objective O2 (10×, NA=0.25, W.D., 10.6 mm) collected the multiplexed fluorescent emission, which is registered on a 2D image sensor operating in rolling shutter mode with frame rate up to 3183 fps. A long pass filter (cut-off at 543 nm) in the detection arm cleans the excitation light (FIG. 12). The frequency reticle has a transmission function, $$T(r, \varphi) = \frac{1}{2} + \frac{1}{2}\text{sgn}[\cos(\omega\varphi)],$$

where $\omega=2\pi r$ is the radius-dependent modulation frequency, and sgn( ) is the sign function (FIG. 6). It was fabricated on a transparency film (diameter, 20 mm) and was spun by a step motor (rotation speed=120–2000 rpm) with phase-locked angular-speed control. To evaluate the photobleaching performance, the setup is configured to generate three illumination scenarios corresponding to the CLAM, single-beam light sheet, and confocal microscopies. For single-beam light sheet and confocal cases, the coherent illumination bypasses the mirror pair with additional (cylindrical) lenses to manipulate the incident profile.

Figure 13:
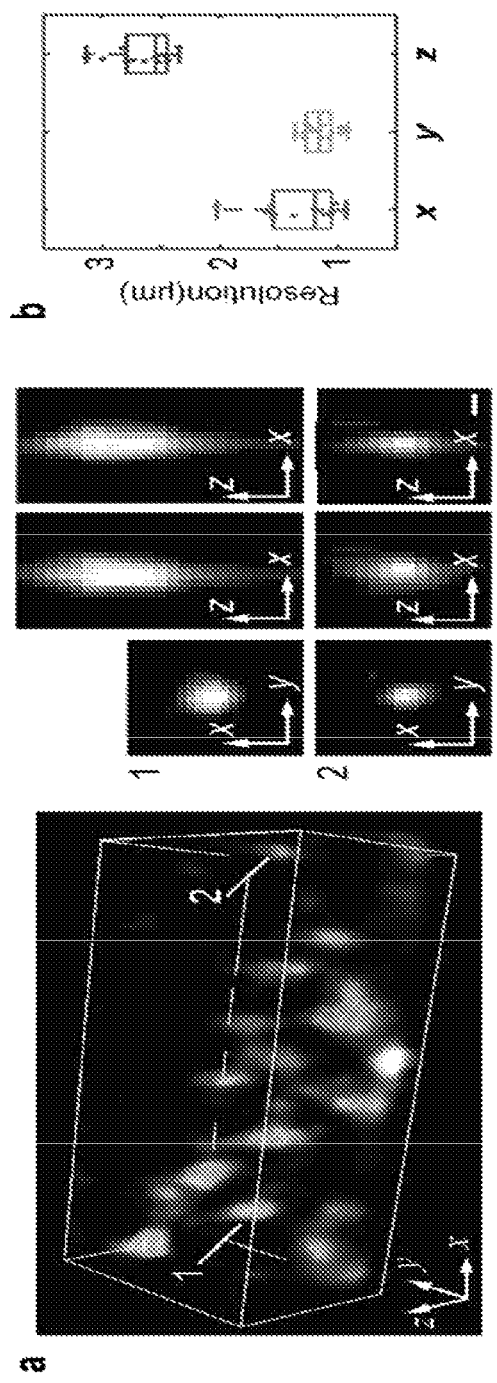
FIG. 13 shows an embodiment of an image reconstruction.

Without complex computation, the image reconstruction is simply based on pixel-by-pixel short-time Fourier transform of the frequency-multiplexed data followed by standard Richardson-Lucy deconvolution. The 3D point spread function (PSF) of CLAM was evaluated by imaging the fluorescent beads (diameter=100 nm) dispersed on a tilted cover slide. The measured transverse resolution (~1.2 µm, full width at half-maximum (FWHM)) is close to diffraction limit (NA=0.25) whereas the axial resolution (~2.7 µm), as seem in FIG. 13, a-b, is determined by the light-sheet thickness, and separation and the optical transfer function of the detection objective. In FIG. 13, a (Left) is 3D PSF (Volume: 90×40×25 µm³) and (right) is the projected 2D PSFs measured from two beads (bead 1 and 2). Scale bars 2 µm and b is the boxplot of the measured resolution along the 3 dimensions.

Figure 14:
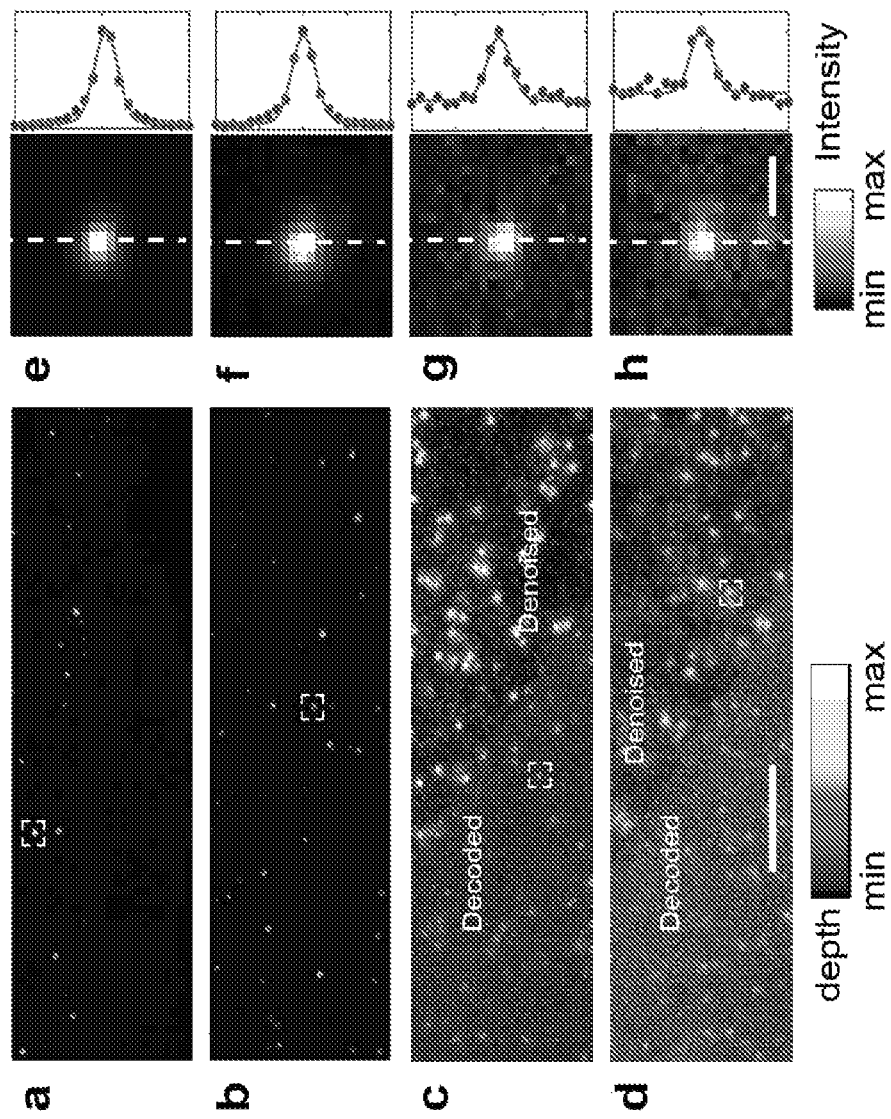
FIG. 14 shows volumetric CLAM imaging of fluorescent micro-beads embedded in strong-scattering agarose gel.

CLAM demonstrates a penetration depth range up to 300 µm, within which the image quality is generally preserved. To verify, fluorescent microbeads (diameter, 1 µm) embedded in a tissue-mimicking phantom were imaged. The fluorescence profiles of the microbeads are consistent for depth up to 300 µm without severe distortion (FIG. 14, a-d). Inspection of the transverse and linear profile of individual nanosphere image allows the dissection of the image quality (FIG. 14, e-h). The titanium dioxide ($TiO_2$) nanoparticle in the phantom has an average diameter of 160 nm characterized by transmission electron microscope. Mie scattering calculation suggests a reduced scattering coefficient of $\mu'_s \sim 22$ cm$^{-1}$ at 532 nm, comparable to the reduced scattering coefficients of the biological tissue. Such performance suggests that the 3D parallelized illumination using the dense, incoherent light-sheet array and thus the multiplexed light-sheet coding do not compromise the penetration depth in the highly scattered medium—comparable to the state-of-the-art scanning-based confocal and LSFM modalities ($\sim$100 µm in depth). In FIG. 14, the depths are a,e 30 µm, b,f 100 µm, c,g 200 µm, and d,h 300 µm; Top right corners in c, d are denoised for comparison. The depth is color-coded in a~d. e~h show the maximum intensity projections (left) and linear intensity profiles (right) of the beads marked in a~d. The scale bars represent 40 µm (a~d) and 5 µm (e~h).

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

EXAMPLE 1

Figure 7:
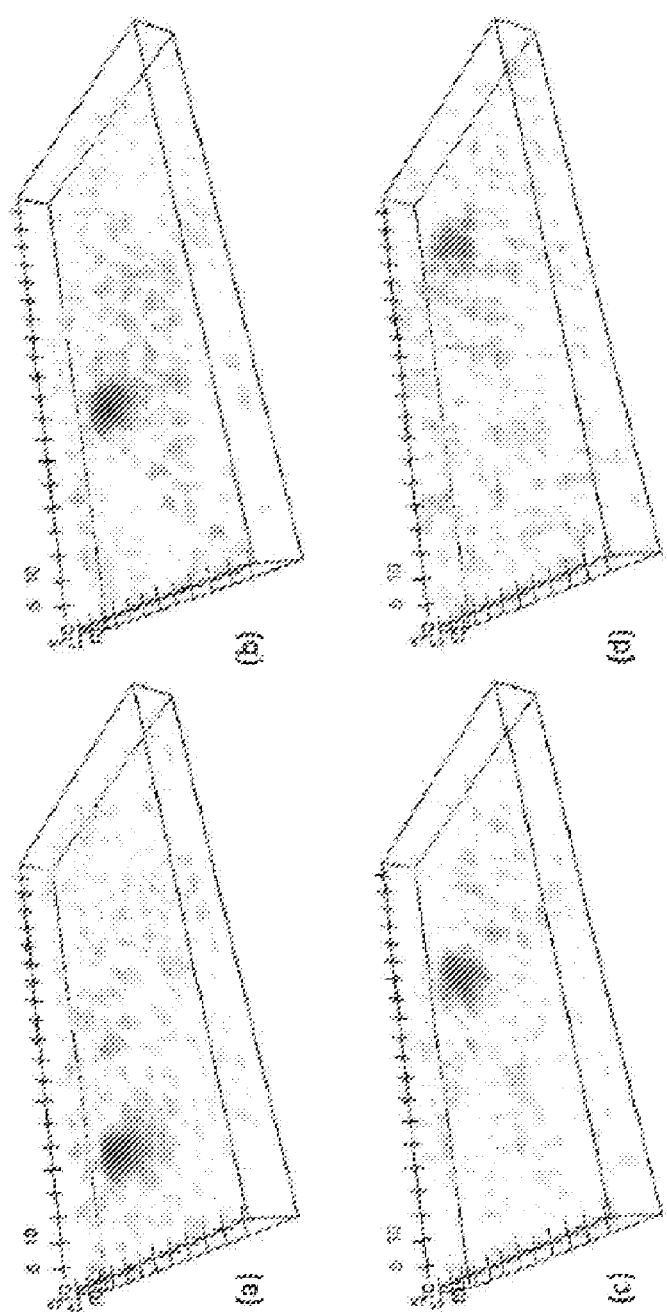
FIG. 7 shows volumetric images of the fluorescent polymer beads at different times.

The fast volumetric imaging device can capture continuous video of dynamic processes occurring in a biological sample. To demonstrate this, 1 µm diameter fluorescent polymer beads were supplied to water and injected by a syringe pump into a square glass pipette. An illumination and a detection objective were positioned orthogonally to the neighboring sides of the glass pipette. This configuration permits the detection objective to capture the dynamic motion of the fluorescent polymer beads in a microfluidic flow. FIG. 7(*a*) shows a volumetric image of the fluorescent polymer beads at 80 ms. FIG. 7(*b*) shows a volumetric image of the fluorescent polymer beads at 680 ms. FIG. 7(*c*) shows a volumetric image of the fluorescent polymer beads at 1.36 s. FIG. 7(*d*) shows a volumetric image of the fluorescent polymer beads at 1.92 s. The volume frame rate was ~25 vol/sec, and the video was used to estimate a speed of 27 µm/sec for the flow.

EXAMPLE 2

Figure 8:
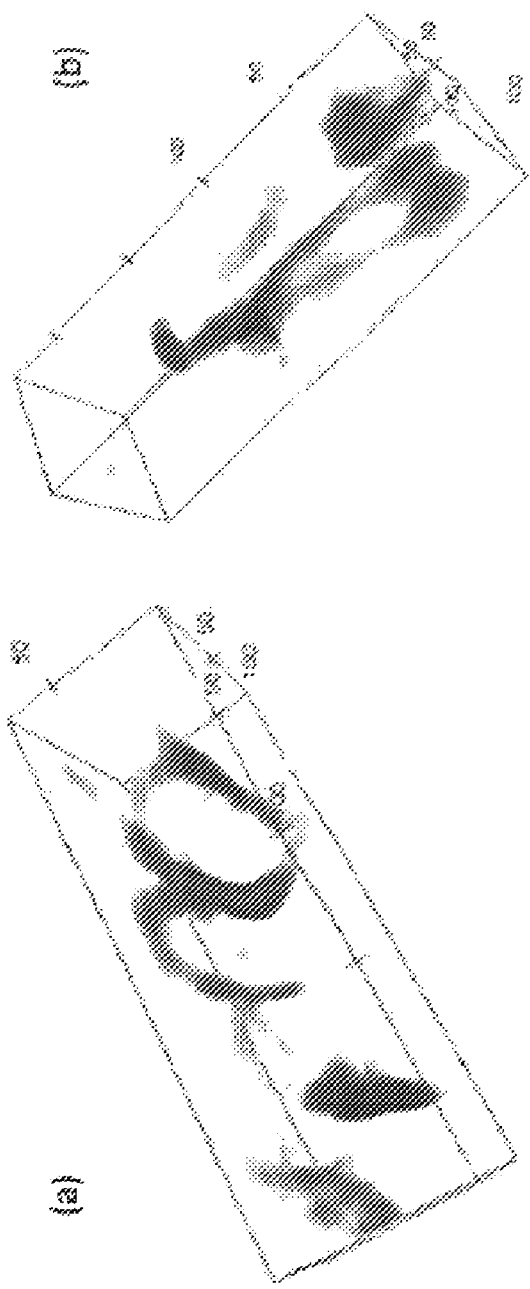
FIG. 8 shows volumetric images of the different vascular networks.

The fast volumetric imaging device was used to image the blood vasculature in mouse intestine and the glomeruli in a mouse's kidney. The intestine and the kidney tissues were cleared in an OPTIClear solution for better optical transparency and labeled on the endothelia cell membrane with a DiI (DiIC$_{18}$) dye. FIG. 8(*a*) is a volumetric image of the network structure of the blood vessels in the intestine. The image demonstrates that even angiogenic sprouts can be clearly visualized. FIG. 8(*b*) shows three glomeruli attached to the blood vascular network in the optically transparent mouse's kidney tissue. The volume frame rate was 1.6 vol/sec.

EXAMPLE 3

Figure 4A:
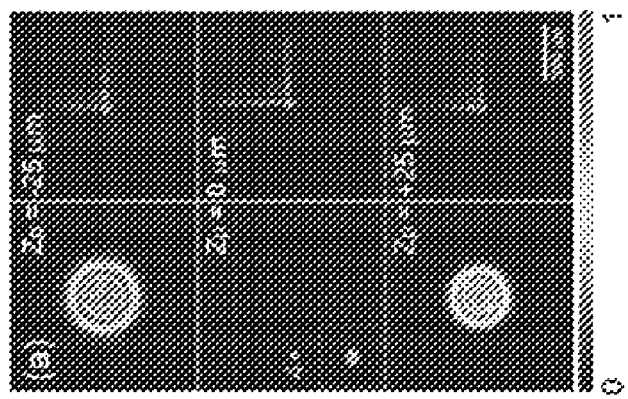
FIG. 4(a) shows images of simulations of a fast volumetric imaging device image point spread function (psf). The images show different axial depths, $Z_p$.
Figure 4B:
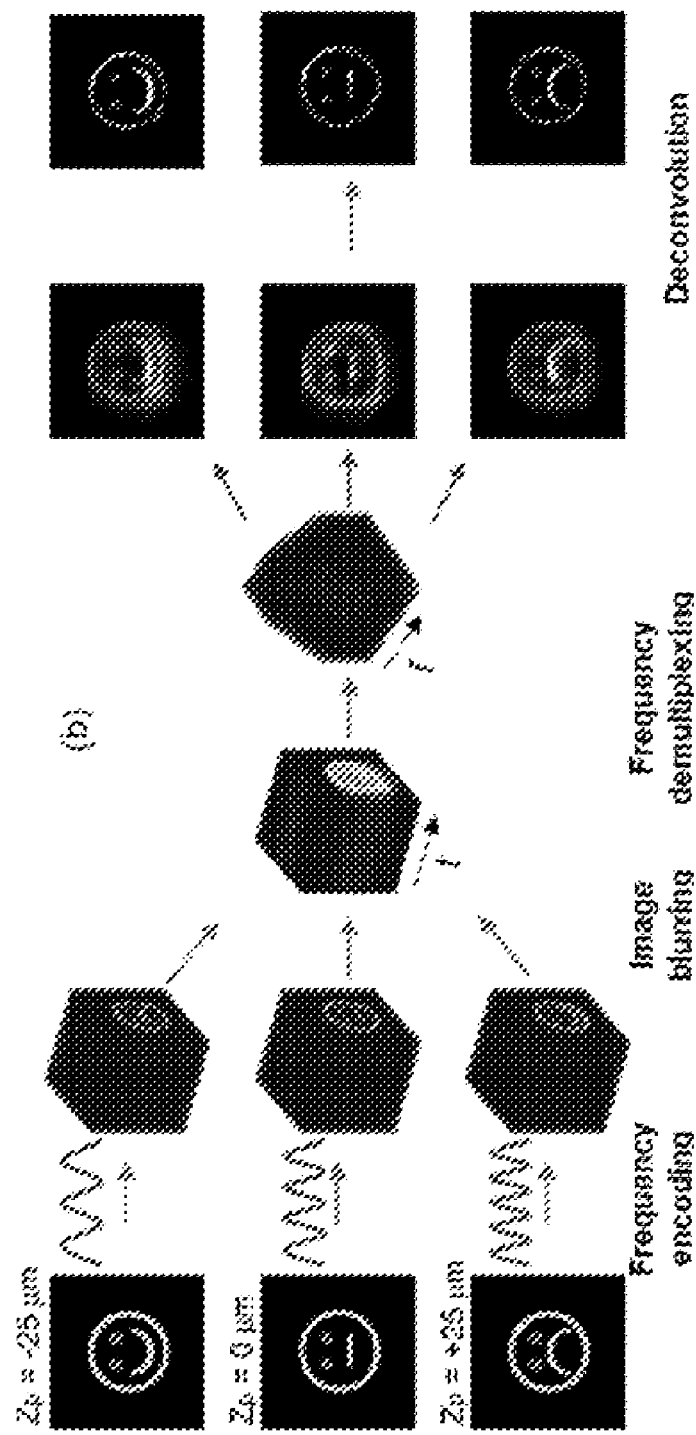
FIG. 4(b) is a diagram of the steps for fast volumetric imaging device image formation using frequency demultiplexing.

The fast volumetric imaging device can be configured to incorporate extended depth-of-focus (DOF) with wavefront coding (WFC). A predefined phase mask can be placed in the detection path such that it engineers the point spread function (psf) of the system to be less depth-variant. A WFC scheme based on a cubic phase mask (CPM) can be used during deconvolution to achieve an extended DOF in the fast volumetric imaging device. The CPM phase function can be described as $\varphi(u,v) = r(u^3+v^3)$, where u and v are the spatial frequency coordinates, and r is the free optimizing parameter. The CPM was placed at the back focal plane of the detection objective lens (20×, NA=0.4). The PSF is nearly invariant across the depth >50 µm. This shows a clear extended DOF effect compared to the PSF without CPM (only having a DOF of ~5 µm). The CPM only modulates the phase and therefore no loss is introduced. The psf simulation study shows the depth invariance (more than 50 µm) of the psf when the CPM is added (see, for example, FIG. 4). The psf images created using the CPM exhibited an asymmetric blur, which can be improved by deconvolution.

To evaluate of the performance of the fast volumetric imaging device, 3 image planes located at different axial positions (Zp=−25, 0, & +25 µm) were simulated. Each position was temporally modulated at 400, 500, & 600 Hz, respectively. The images were sampled at 2 kHz and the 3D frame rate was set as 4 Hz. Image blur and photon noise were also added. Taking the sum of all the 3 image planes at every sample time point, a sequence of 500 multiplexed images with the CPM included were obtained. Demultiplexing the 3 image planes was done by taking the Fourier transform to the image sequence in time. A Richardson-Lucy deconvolution was used with total variation (TV) regularization algorithm (100 iterations, and TV=0.001) to restore the 3 images. The restored images preserved all the major original features and blurring was suppressed.

By using either demultiplexing concept shown in FIG. 3 and using a deconvolution algorithm, the major original features of the 3 images were restored. The image blur can be removed by deconvolution. The approaches shown in FIGS. 3(a) and 3(b) can each be used to encode the beam with different codes (e.g., modulating frequencies in FDM, or PN/WH code in CDM) along one dimension (x-direction) that is later mapped to different light-planes/light-sheets in a 3D stack of an illumination array.

EXAMPLE 4

Figure 15:
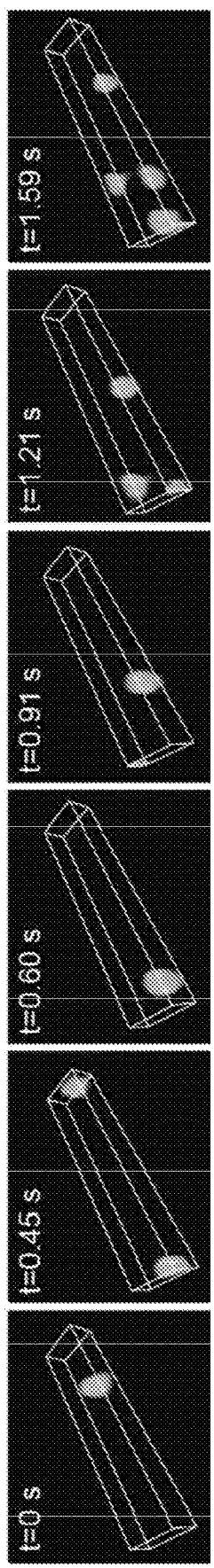
FIG. 15 shows CLAM imaging of microparticles flowing in the micropipette with a volumetric frame rate of 13.2 vol/s (Volume: 170×25×28 μm$^3$).

The inventor further evaluated the imaging speed of CLAM by imaging the flowing fluorescent beads supplied by a microfluidic pump into a fluidic channel (square glass pipette, inner side length 1 mm). As a proof-of-concept experiment, the CLAM system, configured within the frequency range (BW) from 1100~1400 Hz and a total N=24 light sheets, is able to capture the microspheres in flow (flow rate of ~20 μm/s) at the volumetric rate $f_{vol}$ up to 13 vol/sec, as seen in FIG. 15. It is noted that the practical volume rate in the current setup can further be enhanced depends on the number of light sheets (N) required for the experiments. For instance, the volume rate can be increased to ~25 vol/s with our current camera when the imaging FOV along axial direction is reduced by half (i.e., N=12).

EXAMPLE 5

Tissue clearing renders large biological sample, e.g., whole organism, transparent by homogenizing the refractive index through replacing, removing, modifying part of the components without altering its anatomical structure. This allows the analyze of the tissue structure under light microscopy with minimum light scattering, and thus image degradation. CLAM provides an advanced tool for 3D visualization of the tissue structures combined with tissue clearing. Here, a recent method, called OPTIClear, is employ to render the tissue transparent, because of its detergent- and denaturant-free nature with minimal structural and molecular alteration, and use CLAM to image the OPTIClear-treated mouse tissues (ileum and kidneys) perfused with a lipophilic carbocyanine dye (DiI). The specimen was immersed in the medium (n=1.47) in order to achieve spherical-aberration-assisted extended DOF.

Figure 16:
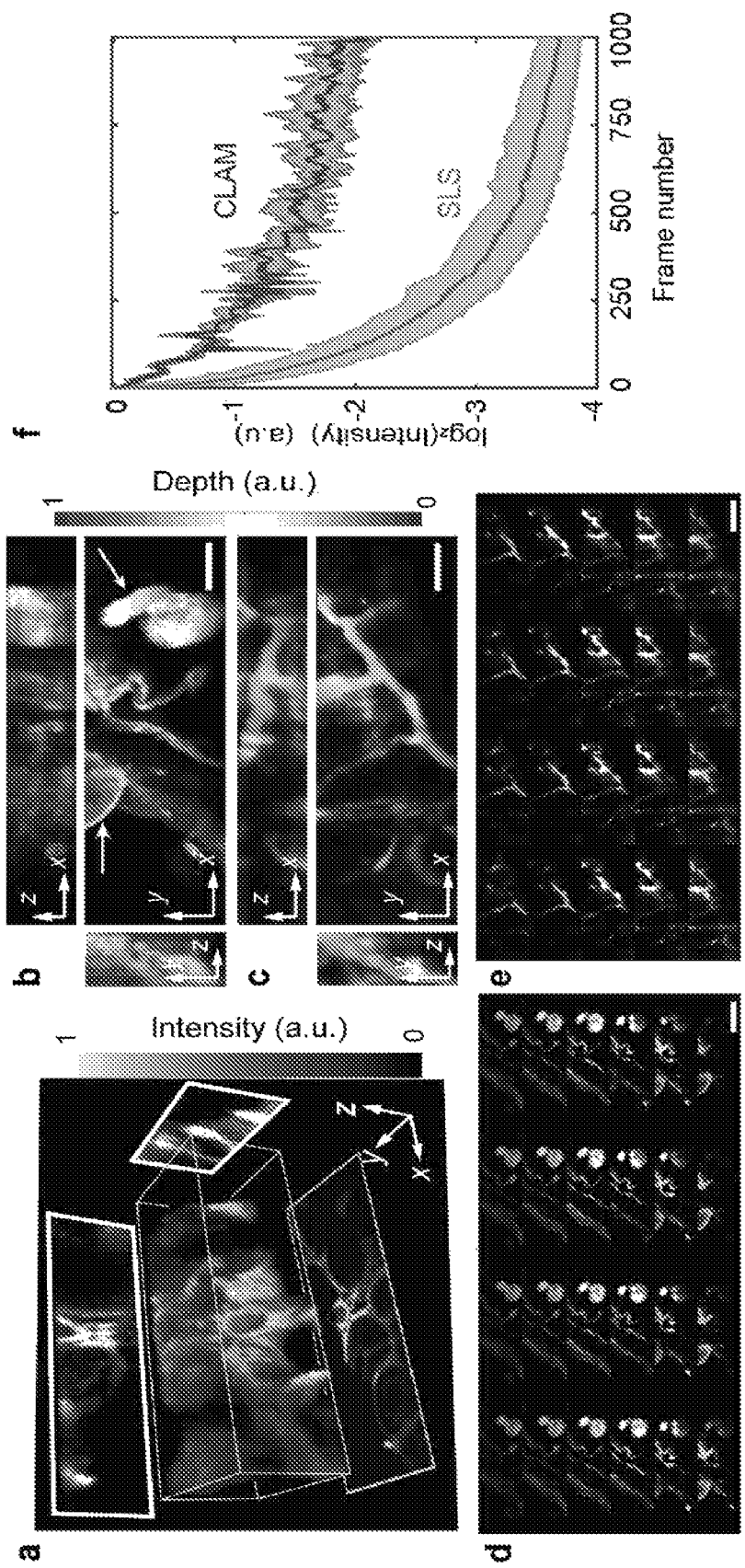
FIG. 16 shows volumetric imaging of optically cleared mouse tissue by CLAM.

The inventor demonstrates that, tubular epithelial structures, as seen in FIG. 16, a, and the glomeruli in the mouse kidney, as seen in FIG. 16, b, as well as the blood vasculature in mouse intestine as seen in FIG. 16, c, could all be visualized at a volume rate of ~6.6 vol/sec. Using a total of up to 34 densely packed multiplexed light sheets, CLAM captured all the optically sectioned planes simultaneously, without any beam scanning or objective actuation, as seen in FIG. 16, a-e. More importantly, the applicability of CLAM in biological imaging is further substantiated by its much lower risk of photodamage and/or photobleaching thanks to the 3D parallelization. This benefit exemplified is by comparing the photobleaching effect between two continuous illumination scenarios corresponding to LSFM and CLAM, respectively (See Methods). Clearly, CLAM outperforms the LSFM in significantly slower photobleaching, as seen in FIG. 16, f. The lower photobleaching rate and thus potentially lower risk of photodamage/phototoxicity in CLAM is attributed to its highly parallelized operation (100% spatial duty cycle) which requires lower illumination intensity and enjoys longer exposure time, without sacrificing the SNR and imaging speed. It is noted that Standard confocal microscopy illuminates the sample with a focused beam, of which the power density is on the order of tens of $kW/cm^2$.

The invention on the coded light sheet fluorescence microscopy has a power density about 4 orders of magnitude smaller, which inhibits photobleaching and cytotoxicity associated with the exogenous fluorescent labels and photodamage to the biological specimen. Therefore, It is anticipated that CLAM could be particularly valuable in long-term biological monitoring applications, especially in developmental biology.

In FIG. 16, a. is a 3D rendered image with three orthogonal standard-deviation-intensity projections (SDIP) of the tubular epithelial structures in the mouse kidney (N=34) at a volume rate of 6.6 vol/sec. Volume: 230×73×65 $\mu m^3$. The SDIP of b. is the glomeruli (see the arrows) and c. is the intestine blood vasculature in the mouse along the 3 orthogonal axes. d-e The montages of the 2D sections of the images in b, c, respectively; c is comparison of photobleaching of two illumination conditions: single light-sheet (SLS, N=1, red), and light-sheet array (CLAM, N=40, blue). Shaded areas represent ±1 standard deviation of each condition (20 and 30 measurements for the case of SLS and CLAM, respectively). The scale bars represent b, c 20 μm and d, e 40 μm.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

The invention claimed is:

1. A light-sheet based microscopy device comprising:
   a light source;
   a pair of mirrors configured to receive light from the light source and generate an array of coherent light sheets, wherein the coherent light sheets are mutually spatially incoherent from each other, and wherein the pair of mirrors is further configured to reconfigure a coherency of the coherent light sheets with respect to each other;
   an encoder configured to encode the array of incoherent light sheets, the encoder comprising: a frequency modulator configured to segment the array of coherent light sheets and encode each coherent light sheet with a respective frequency; or a temporal modulator configured to segment the array of coherent light sheets by an arbitrary orthogonal encoding basis including a Hadamard basis or a random mask;
   at least one lens configured to direct the encoded light sheets towards a biological sample, and
   an image capturing device configured to receive a fluorescence signal from the biological sample.

2. The light-sheet based microscopy device of claim 1, wherein the light source is at least one laser or a combination of multiple lasers at different wavelengths.

3. The light-sheet based microscopy device of claim 1, wherein the pair of mirrors each has a respective reflectivity of greater than 99%.

4. The light-sheet based microscopy device of claim 1, further comprising a beam expander configured to expand or reduce a beam of light from the light source.

5. The light-sheet based microscopy device of claim 1, further comprising an illumination objective configured to transmit light to the biological sample, and a detection objective disposed orthogonally from the illumination objective.

6. The light-sheet based microscopy device of claim 1, further comprising circuitry for demultiplexing an image signal.

7. The light-sheet based microscopy device of claim 1, wherein the image capturing device is a 2D image sensor or a camera, and the image capturing device is configured to capture a video, and wherein an image capturing device objective either is disposed orthogonally from the illumination objective or is in line with the illumination objective.

8. A light-sheet based microscopy device comprising:
a light source;
an angle-misaligned mirror pair configured to receive light from the light source and generate an array of coherent light sheets, wherein the light sheets are mutually spatially incoherent from each other, wherein a density and a coherency of the coherent light sheets with respect to each other are reconfigurable by tuning a geometry of the angle-misaligned mirror pair;
a light sheet encoder configured to encode the array of coherent light sheets to form a parallelized illumination, the light sheet encoder comprising a frequency modulator configured to segment the array of coherent light sheets and encode each light sheet with a respective frequency, the frequency modulator comprising a spinning reticle;
at least one lens configured to direct the encoded light sheets towards a biological sample, and
an image capturing device configured to receive a fluorescence signal from the biological sample.

9. The light-sheet based microscopy device of claim 8, further comprising a beam shaper to shape the light entered into the angle-misaligned mirror pair to form a line-focused beam with a cone angle.

10. The light-sheet based microscopy device of claim 8, further comprising a relay-lens configured to pass through the projected encoded light sheets to form an array of N light-sheets.

11. The light-sheet based microscopy device of claim 8, wherein a degree coherence among the coherent light sheets in the array with respect to each other is adjustable by tuning a mirror separation S, and the array density of the coherent light sheets is configurable by adjusting a mirror misalignment angle $\alpha$.

12. The light-sheet based microscopy device of claim 8, further comprising a wavefront coding/shaping component configured to increase the field-of-view (FOV) in both axial and lateral dimensions.

13. The light-sheet based microscopy device of claim 8, the at least one lens comprising exactly one objective lens configured to direct the encoded light sheets towards the biological sample.

14. The light-sheet based microscopy device of claim 8, the at least one lens comprising two objective lenses configured to direct the encoded light sheets towards the biological sample.

15. The light-sheet based microscopy device of claim 8, the encoded light sheets being configured to capture multiple structured images simultaneously.

16. The light-sheet based microscopy device of claim 8, the light sheet encoder further comprising a temporal modulator configured to segment the array of coherent light sheets by an arbitrary orthogonal encoding basis including a Hadamard basis or a random mask.

17. The light-sheet based microscopy device of claim 1, the at least one lens comprising exactly one objective lens configured to direct the encoded light sheets towards the biological sample.

18. The light-sheet based microscopy device of claim 1, the at least one lens comprising two objective lenses configured to direct the encoded light sheets towards the biological sample.

19. The light-sheet based microscopy device of claim 1, the encoded light sheets being configured to capture multiple structured images simultaneously.

20. The light-sheet based microscopy device of claim 1, the encoder comprising the frequency modulator, and
the frequency modulator comprising a spinning reticle.

* * * * *